US012223825B2

(12) United States Patent
Rodolico et al.

(10) Patent No.: US 12,223,825 B2
(45) Date of Patent: Feb. 11, 2025

(54) MONITORING SECURITY

(71) Applicant: Comcast Cable Communications, LLC, Philadelphia, PA (US)

(72) Inventors: Joseph Thomas Rodolico, Horsham, PA (US); Christopher Stone, Newtown, PA (US); Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/142,927

(22) Filed: May 3, 2023

(65) Prior Publication Data

US 2023/0326329 A1 Oct. 12, 2023

Related U.S. Application Data

(63) Continuation of application No. 17/739,995, filed on May 9, 2022, now Pat. No. 11,676,478, which is a continuation of application No. 16/685,872, filed on Nov. 15, 2019, now Pat. No. 11,367,341, which is a continuation of application No. 15/233,279, filed on Aug. 10, 2016, now Pat. No. 10,535,252.

(51) Int. Cl.

| | |
|---|---|
| ***G08B 29/18*** | (2006.01) |
| ***G08B 13/08*** | (2006.01) |
| ***G08B 13/16*** | (2006.01) |
| ***G08B 21/10*** | (2006.01) |
| ***G08B 29/04*** | (2006.01) |
| *G08B 13/196* | (2006.01) |
| *G08B 25/00* | (2006.01) |
| *G08B 25/14* | (2006.01) |

(52) U.S. Cl.
CPC ........... *G08B 29/185* (2013.01); *G08B 13/08* (2013.01); *G08B 13/1663* (2013.01); *G08B 21/10* (2013.01); *G08B 29/188* (2013.01); *G08B 13/19697* (2013.01); *G08B 25/008* (2013.01); *G08B 25/14* (2013.01); *G08B 29/046* (2013.01)

(58) Field of Classification Search
CPC .. G08B 29/185; G08B 29/188; G08B 29/046; G08B 13/08; G08B 13/1663; G08B 21/10
See application file for complete search history.

(56) References Cited

U.S. PATENT DOCUMENTS

| | | |
|---|---|---|
| 4,808,972 A | 2/1989 | Nicholls |
| 5,111,187 A | 5/1992 | Heckleman et al. |
| 6,504,479 B1 | 1/2003 | Lemons et al. |

(Continued)

FOREIGN PATENT DOCUMENTS

| | | |
|---|---|---|
| CN | 106014075 A | * 10/2016 |
| CN | 106677661 A | * 5/2017 |

(Continued)

*Primary Examiner* — Rowina J Cattungal
(74) *Attorney, Agent, or Firm* — Banner & Witcoff, Ltd.

(57) ABSTRACT

Premises management systems may comprise one or more pressure sensors and one or more pressure plates. A pressure sensor may be located on a first sash of a window at a premises. A pressure plate may be coupled to the pressure sensor and may be located between the first sash of the window and a second sash of the window. A position of the pressure plate relative to the pressure sensor and/or between the first sash and the second sash may be adjustable.

20 Claims, 11 Drawing Sheets

(56) References Cited

U.S. PATENT DOCUMENTS

| | | | | |
|---|---|---|---|---|
| 7,218,217 | B2 | 5/2007 | Adonailo et al. | |
| 7,248,155 | B2 | 7/2007 | Wang et al. | |
| 7,375,646 | B1 | 5/2008 | Diaz-Lopez | |
| 8,248,226 | B2 | 8/2012 | Friar | |
| 8,659,424 | B2 | 2/2014 | Krumhansl et al. | |
| 8,710,983 | B2 | 4/2014 | Malkowski | |
| 2004/0059438 | A1 | 3/2004 | Sherlock | |
| 2007/0279239 | A1 | 12/2007 | Lachenit et al. | |
| 2009/0112525 | A1 | 4/2009 | Adani | |
| 2009/0140858 | A1* | 6/2009 | Gore | G08B 29/046 340/547 |
| 2011/0169638 | A1 | 7/2011 | Krumhansl et al. | |
| 2013/0335219 | A1 | 12/2013 | Malkowski | |
| 2014/0092711 | A1 | 4/2014 | Bagratashvili | |
| 2014/0266762 | A1 | 9/2014 | Warren et al. | |
| 2015/0154850 | A1* | 6/2015 | Fadell | G06Q 10/083 340/501 |
| 2015/0195693 | A1 | 7/2015 | Hooriani et al. | |
| 2016/0150338 | A1 | 5/2016 | Kim et al. | |
| 2016/0189503 | A1 | 6/2016 | Johnson et al. | |
| 2017/0024983 | A1 | 1/2017 | Reeves et al. | |
| 2017/0132888 | A1 | 5/2017 | Conlon et al. | |
| 2018/0012463 | A1 | 1/2018 | Chaudhry et al. | |

FOREIGN PATENT DOCUMENTS

| | | | | |
|---|---|---|---|---|
| EP | 0704587 | A1 * | 3/1996 | |
| WO | 1998028706 | A1 | 7/1998 | |
| WO | WO-2014198204 | A1 * | 12/2014 | E05B 65/08 |

* cited by examiner

MONITORING SECURITY

CROSS-REFERENCE TO RELATED APPLICATION

This application is a continuation of and claims priority to U.S. patent application Ser. No. 17/739,995 filed May 9, 2022, which is a continuation of U.S. patent application Ser. No. 16/685,872 filed Nov. 15, 2019 (now U.S. Pat. No. 11,367,341), which is a continuation of U.S. patent application Ser. No. 15/233,279 filed Aug. 10, 2016 (now U.S. Pat. No. 10,535,252), each of which is hereby incorporated by reference in its entirety.

BACKGROUND

A security monitoring system, such as those installed in a home or other type of premise, typically raise or provide for an alarm if a sensor associated with the system is tripped and the system is armed. The security system may then attempt to notify one or more users of the security system to verify if the alarm was false or true. Once raised, a false alarm can waste the time of users, and waste the resources of authorities. Accordingly, there is an ever present need to improve methods for determining an alarm or an event by a security monitoring system to, for example, lessen the risk of raising a false alarm or falsely raising an alert level towards an alarm. There is also an ever present need to improve methods for notifying a user or another entity to the occurrence of an alarm or another event so that, for example, the user or the other entity is able to respond to the alarm or the other event more efficiently. There is also an ever present need to improve methods for responding to an alarm or another event so that, for example, the information provided in connection with an alarm or the other event can be used to improve the operation of the security monitoring system. These and other shortcomings are addressed by the present disclosure.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

Aspects of this disclosure relate to monitoring security of a premises and/or entry points of a premises. One or more aspects of the disclosure may relate to methods for determining non-alarm or false alarm events that occur at a premises being provided with a security monitoring service. Such non-alarm or false alarm events may include, for example, seismic events and knock events.

The summary here is not an exhaustive listing of the novel features described herein, and are not limiting of the claims. These and other features are described in greater detail below.

BRIEF DESCRIPTION OF THE DRAWINGS

Some features herein are shown by way of example, and not by way of limitation, in the accompanying drawings. In the drawings, like numerals reference similar elements between the drawings.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
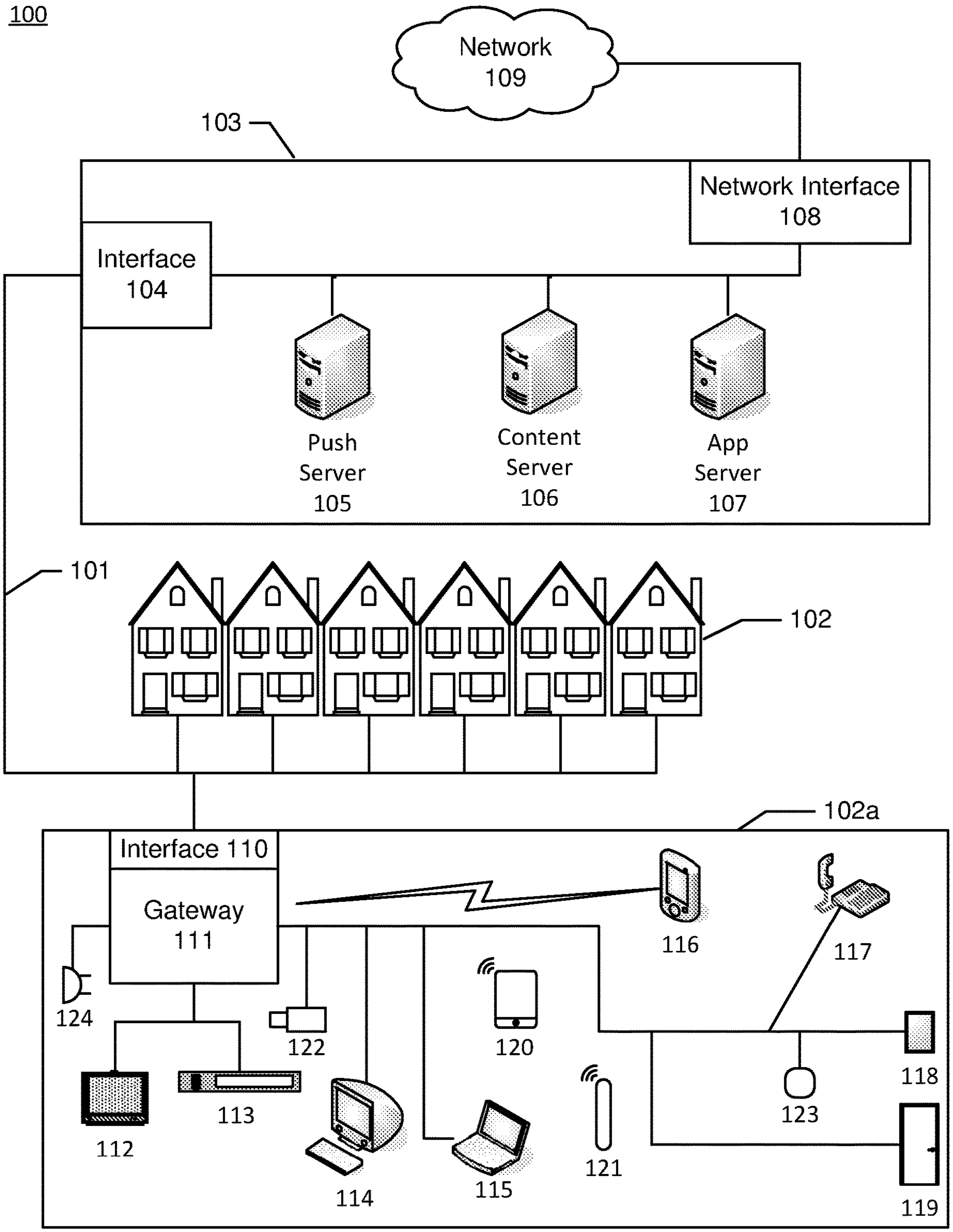
FIG. 1 shows an example information distribution network that may be used to implement one or more aspects as described herein.

FIG. 1 shows an example information distribution network 100 on which many of the various features described herein may be implemented. Network 100 may be any type of information distribution network, such as satellite, telephone, cellular, wireless, etc. One example may be a wireless network, an optical fiber network, a coaxial cable network, or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc., and/or other types of devices such as tablets, cell phones, laptops, and/or computers, etc.) to a local office 103 (e.g., a headend, a processing facility, a local exchange carrier, a gateway, a network center or other network facility, etc.). The local office 103 may transmit downstream information signals onto the links 101, and each premises 102 may have one or more receivers used to receive and process those signals.

There may be one or more links 101 originating from the local office 103, and it may be split a number of times to distribute the signal to various premises 102 in the vicinity (which may be many miles) of the local office 103. The links 101 may include components not shown in FIG. 1, such as splitters, filters, antennas, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include a termination system (TS) 104, such as a cable modem termination system (CMTS) in an example of an HFC-type network, which may be a computing device configured to manage communications between devices on the network of links 101 and backend devices such as servers 105-107 (to be discussed further below). In the example of an HFC-type network, the TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to receive such notifications, including for example, a security system 319 that will be discussed in connection with FIG. 3 and/or various wired and/or wireless devices). The local office 103 may also include a content server 106. The content server 106 may be one or more computing devices that are configured to provide content to users in the homes. This content may be, for example, video on demand movies, television programs, songs, services, information, text listings, security services, etc. In some embodiments, the content server 106 may include software to validate (or initiate the validation of) user identities and entitlements to, for example, enable access to various functions of a security monitoring service; execute the various functions of the security monitoring service; locate and retrieve (or initiate the locating and retrieval of) requested content including security footage; encrypt the content; and initiate delivery (e.g., streaming, transmitting via a series of content fragments) of the content to the requesting user and/or device.

The local office 103 may also include one or more application servers 107. An application server 107 may be a computing device configured to offer any desired service (e.g., security monitoring service or other type of service), and may run various languages and operating systems (e.g., servlets and JSP pages running on Tomcat/MySQL, OSX, BSD, Ubuntu, Red Hat Linux, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102. Another application server may perform various security system functions including storing remotely security camera footage, storing past event history, storing security system criteria, and storing credentials to enable remote operation, control, alarm shutoff, and other security system related functions.

An example premises 102*a* may include an interface 110 (such as a modem, or another receiver and/or transmitter device suitable for a particular network (e.g., a wireless or wired network)), which may include transmitters and receivers used to communicate on the links 101 and with the local office 103. The interface 110 may be, for example, a coaxial cable modem (for coaxial cable lines 101), a fiber interface node (for fiber optic lines 101), a wireless transceiver, and/or any other desired modem device. The interface 110 may be connected to, or be a part of, a gateway interface device 111. The gateway interface device 111 may be a computing device that communicates with the interface 110 to allow one or more other devices in the home and/or remote from the home to communicate with the local office 103 and other devices beyond the local office. The gateway 111 may be a set-top box (STB), digital video recorder (DVR), computer server, security system, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops, tablets and netbooks, mobile phones, mobile televisions, personal digital assistants (PDA), etc.), telephones 117, window security sensors 118, tablet computers 120, personal activity sensors 121, video cameras 122, motion detectors 123, microphones 124, and/or any other desired computers, sensors, such as ambient light sensors, passive infrared sensors, humidity sensors, temperature sensors, carbon dioxide sensors, carbon monoxide sensors, and others. Additional details of the types of components that may be included in a premise, such as premise 102, will be discussed in connection with FIG. 3. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, ZigBee interfaces and others.

Figure 2:
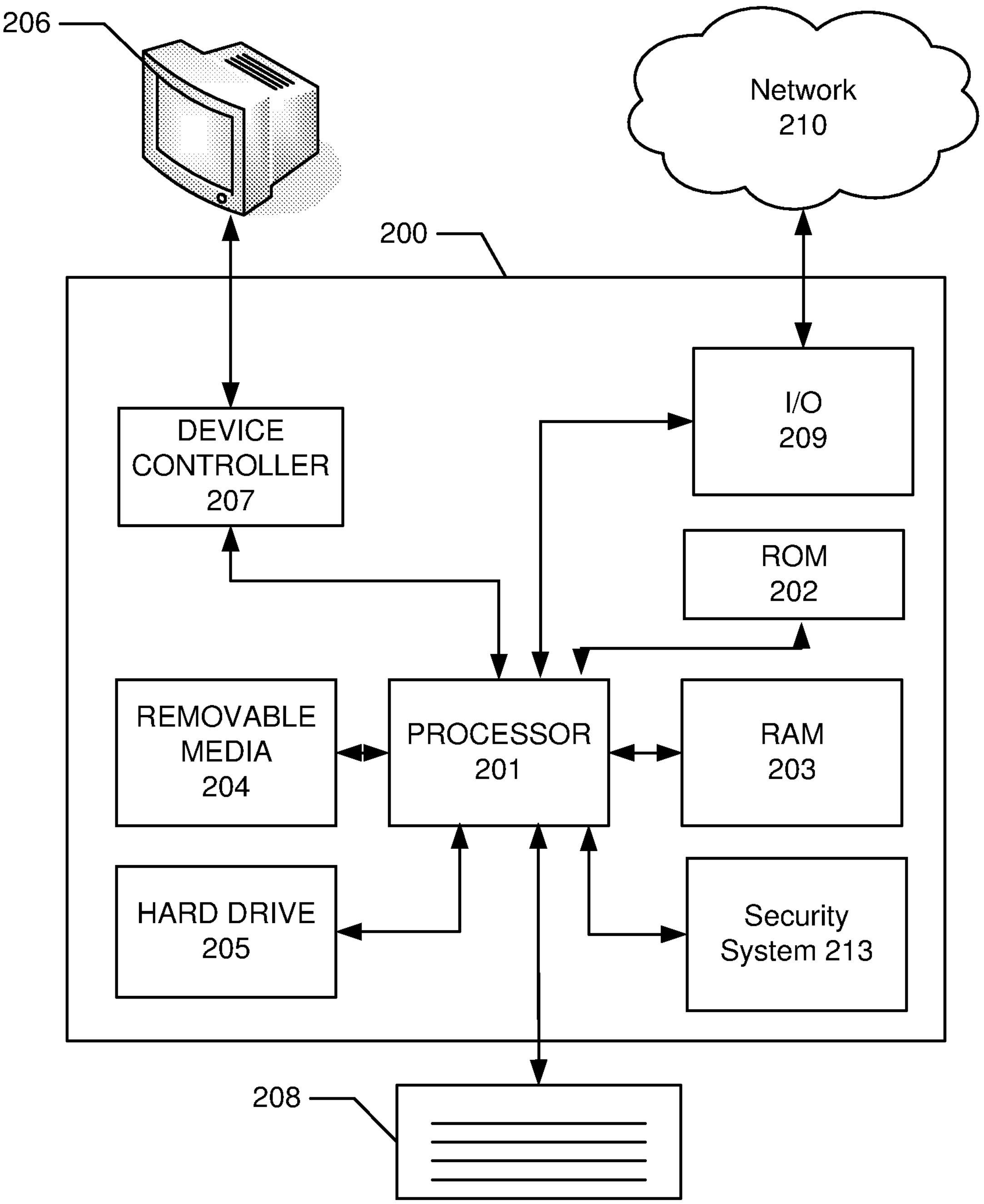
FIG. 2 shows an example computing device that may be used to implement one or more aspects as described herein.

FIG. 2 shows general hardware elements of an example computing device 200 that can be used to implement one or more aspects of the elements discussed herein and/or shown by the figures. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The interface between the computing device 200 and the user input devices 208 may be a wired interface, wireless interface, or a combination of the two, including IrDA interfaces, Bluetooth interfaces and ZigBee interfaces, for example. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a security system 213, any associated application and/or any associated interface which may enable the device to communicate with the other components of a security monitoring system and/or perform the steps, methods, algorithms and flows described herein.

The FIG. 2 example is an example hardware configuration. Modifications may be made to add, remove, combine, divide, etc. components as desired. Additionally, the components shown in FIG. 2 may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as shown in FIG. 2.

One or more aspects of the disclosure may be embodied in computer-usable data and/or computer-executable instructions, such as in one or more program modules, executed by one or more computers (such as computing device 200) or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like.

Figure 3:
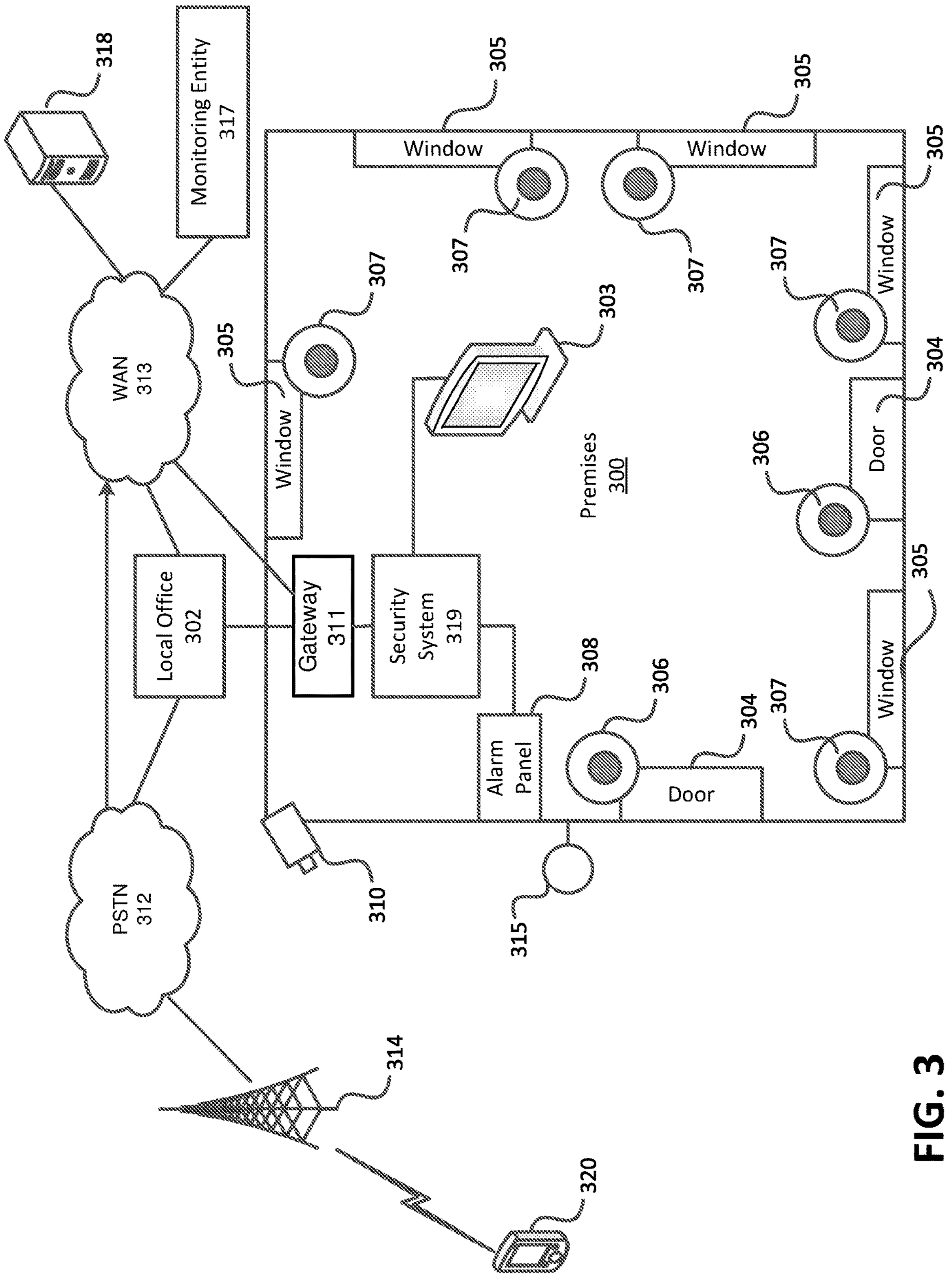
FIG. 3 shows an example operating environment in which one or more of the various features described herein may be implemented.

FIG. 3 shows an example operating environment in which various features described herein may be performed and implemented. The environment may include components and devices that are associated with providing a security monitoring service that, for example, monitors the security of a premises 300 (which may correspond to one of the premises 102 of FIG. 1), such as a user residence, business, recreational facility, etc.

FIG. 3 shows one example of components and devices associated with providing a security monitoring system. The premises 300 may include a number of entry points that are to be monitored by a security system 319 (which may correspond to the security system 213 of FIG. 2) and various other security components (e.g., security sensors 306 and 307, cameras 310, lights 315, alarm panel 308, etc.). The entry points may be referred herein interchangeably as a node. Each entry point or node, as shown in FIG. 3, corresponds to one of the doors 304 or windows 305 of the premises 300.

Each entry point or node may be monitored by one or more sensors, such as security sensors 306 and 307. Each security sensor may be communicatively coupled to the security system 319. For example, as shown in FIG. 3, each entry point that is a door has one or more sensors 306 for monitoring a door. Each entry point that is a window has one or more sensors 307 for monitoring a window. Security system 319 may be able to receive or otherwise monitor data from the security sensors 306 and 307. In some examples, the security sensors 306 for monitoring a door may be a different combination of sensors than the security sensors 307 for monitoring a window (e.g., a door may be provided with a switch sensor that is different than the types of sensors provided for the windows). However, in some variations, the security sensors 306 for monitoring a door may include one or more of the same types of sensors as the security sensors 307 for monitoring a window (e.g., each door and each window is provided with at least one sensor that includes an accelerometer, a magnetometer, and/or a pressure sensor).

A security sensor may be of any type suitable for monitoring some aspect of an entry point or the premise. Non-limited examples of security sensors include video cameras, microphones, ambient light sensors, passive infrared sensors, humidity sensors, temperature sensors, carbon dioxide sensors, carbon monoxide sensors, seismic sensors, pressure sensors, seismometers, magnetometers, accelerometers, mercury switches, gyroscopes, pressure sensitive door mats, proximity sensors, or the like.

While the description herein is primarily directed to the monitoring of entry points/nodes that are doors and windows, other types of nodes may be monitored by one or more security sensors (e.g., traffic areas, exterior locations, and the like). For example, the premises 300 may also include additional security sensors that are not located at a specific entry point or node. As shown in FIG. 3, one or more cameras 310 may be placed at various locations at the premises 300, such as a traffic area of the premises 300 (e.g., video camera 310 may be placed to monitor a hallway) or an exterior area of the premises 300 (e.g., a porch area or driveway area of the premise 300). According to various aspects disclosed herein, images, sounds, and other data captured by a camera 310 or other sensors of may be transmitted by the security system 319, for example, as an email, text message, or through a software application to, for example, a remote or local user or device, for analysis and/or a predetermined and/or dynamically determined action.

One or more lights 315 may be located throughout the premises 300 so as to illuminate an entry point of the premises 300, such as a door 304 or a window 305, or other traffic areas of premises 300 (e.g., a hallway or an exterior location). According to various aspects disclosed herein, the security system 319 may be configured to control the one or more lights 315 to be on or off (e.g., the one or more lights 315 may be controlled to be on as part of a response to a triggered alarm or to strobe on and off as part of the response).

The security system 319 may be configured to control, monitor and/or receive from the various security components depicted in FIG. 3, including the various security sensors 306 and 307, the one or more lights 315, and the one or more cameras 310. The security system 319 may be configured to place the security components in various states (e.g., deactivate a sensor, activate a sensor, disarm a sensor, arm a sensor). A user may be able to interact with the security system 319 to configure the state of the various security components and the state of the security system 319. In one example, an alarm panel 308 may be implemented in proximity to and/or as part of the security system 319. Additionally, the security system 319 may be configured to automatically place the security components in various states. For example, the security system 319 may be able to automatically arm the system and its security components upon detecting that a person is near an entry point (e.g., arm the system if a person is detected near a rear door of the monitored premises based on video received from a video camera monitoring the rear door). Further, the security system 319 may be placing the security components into various states based on an alert level (e.g., the security components are disarmed and/or deactivated based on a "green" alert level; some security components are armed and/or activated based on a "yellow" alert level; and all security components are armed and/or activated based on a "red" alert level).

The various states for the security system 319 and the security components depicted in FIG. 3 may include an armed state (e.g., alarms can be raised), a disarmed state (e.g., alarms are not raised), a disabled state (e.g., power is turned off and/or monitoring is not performed) and an active state (e.g., power is turned on and/or monitoring is performed). For example, the user may arm the security system 319, arm specific entry points (e.g., arm the sensors for a door 304), arm specific security sensors (e.g., arm one or more of the security sensors 306), deactivate various security sensors (e.g., activate camera 310), and the like.

When the security system 319 or various security components are in an armed state, the security system 319 may trigger or raise an alarm based on various conditions. For example, the security system 319 may be monitoring data and/or signals that are received from one or more of the security sensors and, based on the data and/or signals, may determine to raise an alarm. As one particular example, a switch sensor may include a circuit that opens or closes in response to an entry point (e.g., door 304 or window 305) being opened and the switch sensor may transmit a signal indicating whether the circuit is open or closed to the security system 319. The security system 319 may trigger an alarm upon receiving the signal (e.g., an alarm may be triggered if the sensor transmits the signal to the security system 319; or an alarm may be triggered if the signal indicates the circuit is open, which occurred responsive to the entry point opening). As another particular example, a magnetometer may be sending magnetic wave data for the entry point to the security system 319 and the security system 319 may trigger an alarm based on an analysis of the magnetic wave data (e.g., an alarm may be triggered if the sensor transmits data to the security system 319; an alarm may be triggered if the magnetic wave data indicates a magnetic field change above a threshold amount; or an alarm may be triggered if the magnetic wave data, as compared to a historical record of magnetic wave data for that entry point, is determined to be irregular). As a further particular example, a pressure sensor (such as those described below in connection with FIGS. 8A and 8B) may be sending pressure data for the entry point to the security system 319 and the security system may trigger an alarm based on an analysis of the pressure date (e.g., an alarm may be triggered if the sensor transmits data to the security system 319; an alarm may be triggered if the pressure data indicates a pressure below a threshold amount; or an alarm may be triggered if the pressure data, as compared to a historical record of pressure data for that entry point, is determined to be irregular).

Additional details and aspects related to how the security system 319 determines to trigger or raise an alarm, or raise an alert level, will be discussed herein. However, it is noted that there are numerous other ways in which the security system 319 can be configured to determine whether to trigger an alarm. For example, the security system 319 may be configured to trigger an alarm if predefined criteria are satisfied. In some variations, the predefined criteria may be user defined or based on behavioral patterns learned by the security system 319. For example, the user may configure the security system 319 to analyze video received from video sensors that are monitoring one or more of the entry points, compare faces detected from the video to one or more faces of people that are allowed to enter the premise 300, and determine whether to raise an alarm based on the comparison. As one example, the user may configure the security system 319 with pictures of family members' faces (e.g., son, daughter, husband, grandfather, grandmother, and the like). If the grandmother enters the premise 300, the security system 319 may determine to not trigger an alarm if facial recognition determines the face of the grandmother matches one of the faces from the pictures. The security system 319 may, in some variations, use different or additional biometric data as part of the determination of whether to trigger an alarm (e.g., finger-print, voice data, or the like).

Once an alarm is triggered or raised, the security system 319 may perform various actions such as, for example, causing an audible alarm sound to be played, causing an alarm message to be presented on the alarm panel 308, causing lights in the premises 300 to be turned on/off, causing additional sensors to be activated (e.g., turning on video cameras), cause a message to be sent to a mobile device 320 or to a monitoring entity 317. Additional details and aspects related to how the security system 319 responds to a triggered alarm will be discussed herein.

In some examples, security system 319 and/or alarm panel 308 may be implemented in a computing device, such as a device depicted in FIG. 2. The security system 319 and/or alarm panel 308 may be implemented as part of a gateway, such as a gateway depicted in FIG. 1. Thus, in one example, gateway 311 may be communicatively coupled to the security sensors 306 and 307 and the other security components depicted in FIG. 3, which may allow gateway 311 to arm, disarm, deactivate, activate and/or monitor the security sensors 306 and 307 and the various other security components depicted in FIG. 3.

The security sensors 306 and 307, cameras 310, lights 315, alarm panel 308, and security system 319 may be communicatively coupled to a user interface device, such as the television 303 or the various devices depicted in FIG. 1, including the personal computer 114, the tablet 120 and/or the wireless device 116. Through interactions with the user interface device, an authorized user may configure any of the security components depicted in FIG. 3. The security components may also transmit data between each other and/or the user interface device. For example, data (e.g., pictures, video, audio, various types digital or analog signal, and the like) from one of the security components (e.g., camera 310 or security sensor 306) may be transmitted to the user interface device for display.

In some embodiments, the security system 319 may be configured to confirm the location and identify of a user or other individual in the premises 300. For example, the security system 319 may determine the location of a user based on GPS location of a cellular device (e.g., mobile device 320). The security system 319 may also verify the identity of each user in the security network within premises 300 using several known recognition techniques, including for example, known key code, voice recognition, facial recognition, pattern recognition, body-mass recognition, fingerprint recognition, retina scanner recognition, and the like. The various recognition processes may be based on data collected from various security components within premises 300 or from another device in which the user provides the data (e.g., via a microphone of mobile device 320). For example, the data may be collected, from a camera, microphone, infrared sensor, fingerprint scanner, biometric sensor, or other type of sensor. The collected data may also be used to verify that the user is not under duress when he or she clears the alarm. For example, the surrounding area may be scanned to determine if another person is near a user attempting to deactivate the alarm and/or a voice of a user attempting to deactivate the alarm notification may be analyzed to determine if the user is in distress (e.g., if the user is in duress there may be more detected sounds and/or movements within the premises, such as yelling, doors opening, people moving, and the like, as compared to a false alarm).

FIG. 3 also shows that the security system 319 may communicate other entities, such as the local office 302 and the monitoring entity 317. Thus, the security system 319 may transmit data to the local office 302 or the monitoring entity 317. The data may include information related to the security of the premises 300 such as, for example, information for an event detected by the security system 319 (e.g., a notification indicating there was a knock on a door), information for an alarm triggered by the security system (e.g., a notification that an alarm was triggered at the premises 300). The data, however, may include any data that could be monitored and/or recorded by the security system 319 or the other security components.

In some instances, transmitting data to the local office 302 and/or the monitoring entity 317 may assist in countering "smash and grab" scenarios during which an intruder smashes devices of the security monitoring system (e.g., alarm panel 308, camera 310, security sensors 306 and 307, etc.) in hopes of disabling the security monitoring system or preventing recording of the alarm event. In a smash and grab scenario, the security system 319 may transfer information upstream to the local office 302 and/or monitoring entity 317 so that the authorities can be alerted and/or data regarding the alarm or other events can be captured before the security monitoring system is disabled. In some examples, the security monitoring system may be detected based on non-receipt of a heartbeat signal. For example, the security system 319 may be configured to send a periodic signal to the local office 302 and/or monitoring entity 317 and, if the security system is disabled, the local office 302 and/or monitoring entity 317 can take action and/or alert authorities after the periodic signal is not received. Additionally, the security system 319 may be configured to increase and/or decrease the period at which the periodic signal is transmitted (each periodic signal may include an indication of a time at which the next signal is to be transmitted). For example, if a person is detected as moving through the premises, the periodic signals may be transmitted according to a faster schedule (e.g., every second), but if a person has not been detected within the premises after a particular amount of time, the periodic signals may be transmitted according to a slower schedule (e.g., every five minutes).

Referring to FIG. 3, when an alarm is triggered, the local office 302 may record information relating to the alarm (e.g., store information identifying the sensor(s) that were tripped, the location of the sensor(s) in the premises 300, record video and/or audio that depicts events that occurred during a time period based on when the alarm was triggered, etc.). Based on the recorded information, the local office 302 may determine an appropriate reaction and may transmit a signal to an external network, such as the public switched telephone network PSTN 312 and/or a wide area network WAN 313 (or the various networks depicted in FIG. 1, such as links 101 and network 109). For example, data from the security system 319 may be transmitted to and/or from the local office 302 and a user's mobile device 320 (e.g., via the PSTN 312 and the cell tower 314). In this manner, the user may receive notifications related to the security of the premises 300 and/or be able to control the security system 319 via the mobile device 320. The notifications may be received by the mobile device 320 in various forms including, for example, an email, text message, or phone call. The user may receive the notifications via a dedicated software application installed on the mobile device 320 or via another application (e.g., an e-mail client or a text message client). Also, through the PSTN 312, the local office 302 and/or the monitoring entity 317 may connect to a public safety answering point (PSAP). Thus, the local office 302 and/or the monitoring entity 317 may alert authorities of the alarm, so that the authorities may be dispatched to the premises 300.

Additionally, or alternatively, the local office 302 and/or the security system 319 may transmit information related to the security of the premises 300 to a monitoring entity 317 via one or more networks such as the WAN 313 (e.g., the Internet). The monitoring entity 317 may be operated by the same entity that operates the local office 302 (e.g., the monitoring entity 317 and the local office 302 may be operated by the same service provider, which may also be the same service provider that operates the distribution network 100 of FIG. 1) or a third party entity (e.g., the monitoring entity 317 may be a third-party home security provider). The monitoring entity 317 may be responsible for monitoring the premises 300. This may include responding to information, received from the security system 319 or the local office 302, that indicates an alarm was triggered for premises 300 or some other type of event occurred at the premises 300. For example, the monitoring entity 317 may immediately contact the appropriate authorities to dispatch them to the premises 300 upon receiving notification that an alarm was triggered for premises 300. As another example, a representative or automated system of the monitoring entity 317 may, in response to receiving notification that an alarm was triggered for premises 300, contact (e.g., via a phone call, e-mail, text, and/or other type of message that can be received by mobile device 320) a user to provide notification of the alarm for premises 300. The monitoring entity 317 may be able to interact with the user to determine whether to contact the authorities or ignore the alarm.

Additionally, the local office 302 and/or the security system 319 may transmit information related to the security of the premises 300 via one or more networks such as the WAN 313 to a web portal server 318. The web portal server may be configured to manage a security monitoring account for the user and/or store information related to the security of the premises 300, such as a history of alarms and other events that occurred at the premises 300. The web portal server 318 may be a computing device capable of providing a web portal through which users may view, on any connected display device, information regarding home security account and/or other information related to the security of the premises 300. The user may access the web portal using any device that can connect to web portal server 318 via the WAN 313.

The user may be able to interact with the web portal in various ways. For example, a user may log onto the web portal (via an authentication process) and view information about a triggered alarm, the alert level, and other collected data related to the alarm, such as data indicating what security sensor(s) caused the alarm to be triggered and a time the alarm was triggered. The user may, in some variations, be able to view video from the various cameras 310 located in the premises 300, and check and/or control the status of the security system 319 and the various security components of the premises 300 (e.g., to see if the security system 319 is armed and then arm or disarm the system as desired).

The web portal may also allow a user to customize settings for the security system 319 and the various security components of premises 300. For example, a user may, via the web portal, customize a schedule to indicate when and how the security system 319 should operate (e.g., indicate certain times during which the security system 319 is to automatically arm/and or disarm itself). The user may provide access to his or her calendar (e.g., a calendar associated with the user's work e-mail account, a calendar associated with the user's private e-mail account) the arming and/or disarming of the security system 319 may be based on the entries of that calendar. Additionally, the security system 319 and/or web portal may use the information of the home security account (e.g., based on a calendar entry or information on the schedule) to determine that a user is outside of the premises, and if the security system 319 has not been armed, to notify the user that the security system 319 is disarmed.

In some embodiments, a user's home security account may be associated with multiple premises and the web portal may provide access to each of the premises associated with the user's home security account. Accordingly, via the web portal, the user view various information related to the security of each premise including alarms, events, video, security settings, and the like. In some cases, the information for each premises may be organized on a single page or display (e.g., a history of alarms and events for all premises may be displayed via the web portal).

In some embodiments, the local office 302, the monitoring authority 317, and/or the security system 319 may communicate with multiple users of the security network. For example, the multiple users may include one or more primary users and one or more secondary users, such as family members or other individuals likely to be in the premises 300 on a regular basis. A primary user may designate what family members (or any other individual) to include as one of the multiple users, and the primary user may designate each family member as a primary user or a secondary user. Other individuals may, based on the desires of a particular user, include members of the primary users' social network, such as neighbors and friends, etc. The primary user and the secondary users, if given authorization, may communicate with the local office 302, the monitoring entity 317 and/or the security system 319, for example, via a software application installed on a mobile computing device or via a web portal.

Figure 4A:
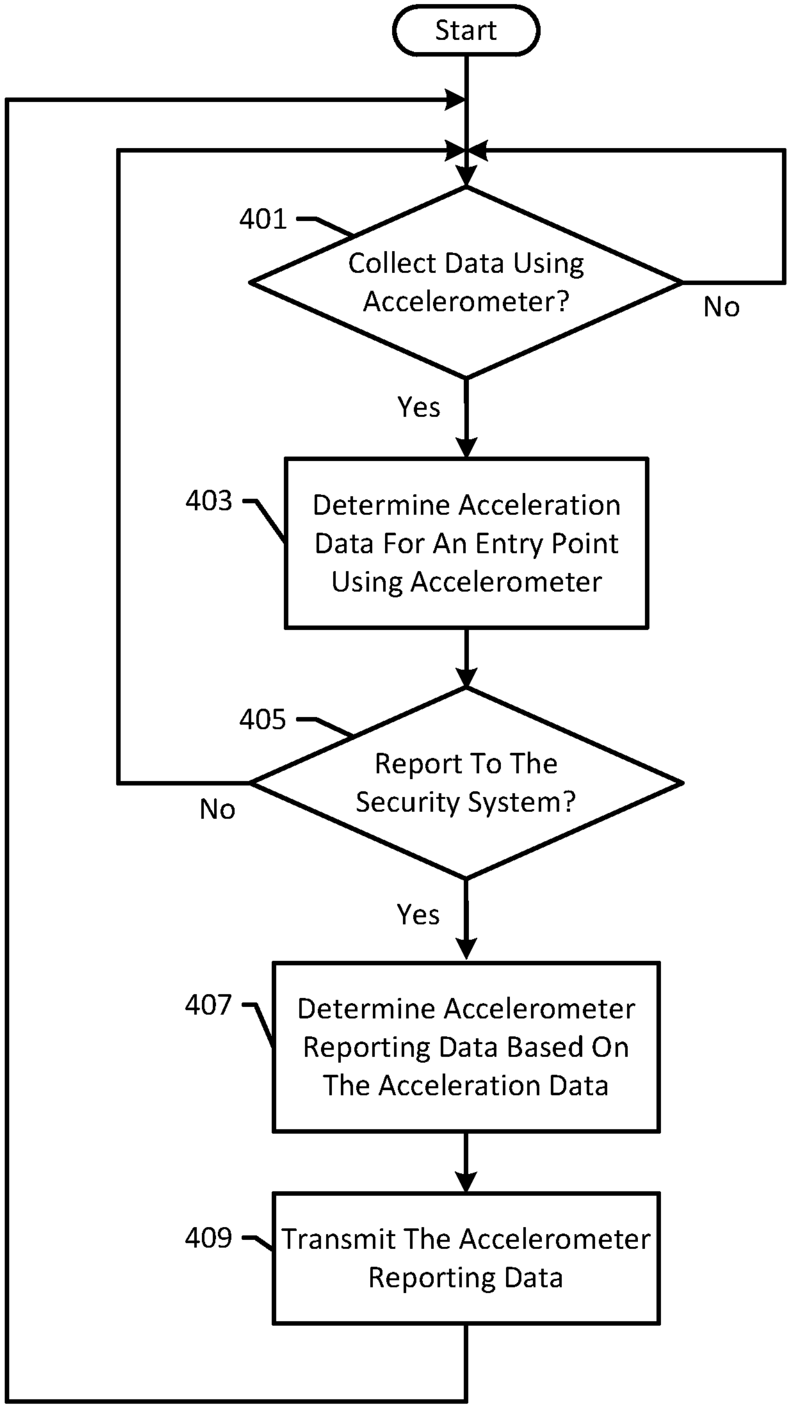
FIGS. 4A and 4B show one or more example methods that are suitable for use by a security sensor and that are in accordance with various aspects described herein.
Figure 4B:
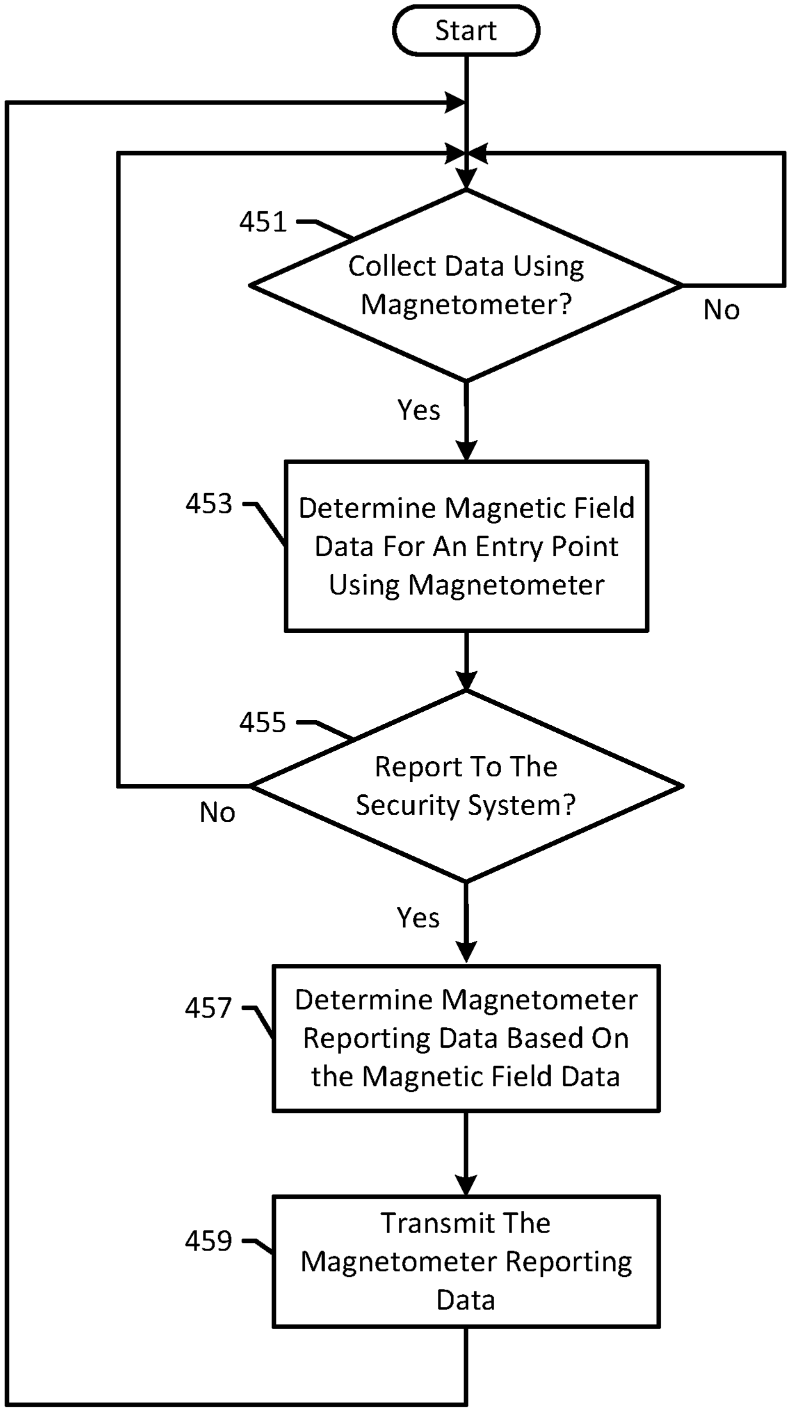

As discussed above, an entry point of a premises may be monitored by one or more security sensors. A security sensor, depending on the type and sensitivity of the sensor, may detect various conditions that occur at or near the entry point. FIGS. 4A and 4B show one or more example methods that are suitable for use by a security sensor, which may be monitoring an entry point of a premises, such as the premises 300 of FIG. 3. In particular, FIG. 4A shows one or more example methods for use by an accelerometer, which may be monitoring for changes in acceleration of an entry point (e.g., changes in acceleration of a door 304 or changes in acceleration of a window 305 of FIG. 3) and may be communicatively coupled to a security system (e.g., security system 319 of FIG. 3). FIG. 4B shows one or more example methods for use by a magnetometer, which may be monitoring for changes in the magnetic field at or near an entry point (e.g., changes in the magnetic field at or near a door 304 or a change in acceleration of a window 305 of FIG. 3). In some examples the accelerometer and the magnetometer could be implemented in separate apparatuses (e.g., a first sensor apparatus includes the accelerometer and a second sensor apparatus includes the magnetometer). In other variations, however, the accelerometer and the magnetometer may be implemented in the same apparatus (e.g., a single sensor apparatus includes both the accelerometer and the magnetometer).

As shown in FIG. 4A, at step 401, a sensor (e.g., security sensor 306 or 307 of FIG. 3) that includes an accelerometer may determine whether to collect data using the accelerometer. In some variations, the sensor may determine whether to collect data using the accelerometer based on a current state of the sensor. For example, as discussed above in connection with FIG. 3, a security system may be able to place sensors in various states including, for example, the armed, disarmed, disabled and active states. Some of the possible states may allow for the sensor to collect data using the accelerometer. However, there may also be one or more possible states where the sensor is not allowed to collect data using the accelerometer. For purposes of providing a more detailed example, step 401 will be discussed in terms of a variation where the armed, disabled and active states allow for the sensor to collect data using the accelerometer, but the disabled state does not allow for the sensor to collect data using the accelerometer. It is noted that other variations could be used including, for example, a variation where the disabled and active states are used to determine whether the sensor provides power to the accelerometer and the disarmed and armed states are used to determine whether to collect data using the accelerometer.

Using the example where the armed, disabled and active states allow for the sensor to collect data using the accelerometer, the sensor may determine its current state. If the sensor determines that the current state is the armed, disarmed or active state, the sensor may proceed to step 403 to initiate the collection of data using the accelerometer. Otherwise, the method may repeat step 401 (or wait a period of time before repeating step 401) until the sensor determines that it is to collect data using the accelerometer. In some instances, instead of repeating step 401 until the sensor determines that it is to collect data using the accelerometer, the method may end.

At step 403, the sensor may determine or otherwise generate acceleration data for an entry point using the accelerometer. In some examples, the sensor may use the accelerometer to measure the acceleration of the entry point and, based on any of the measurements, generate acceleration data. Some accelerometers may be single-axis models that provide a measurement of the magnitude and direction of the acceleration along a single axis. Other accelerometers may be multi-axis models that provide a measurement of the magnitude and direction of the acceleration along each of multiple axes. Accordingly, the acceleration data may, for example, indicate one or more measurements of a magnitude and a direction of the acceleration of the entry point along one or more axis.

At step 405, the sensor may determine whether to report to the security system based on the acceleration data. The sensor may determine whether to report to the security system in various ways. For example, the sensor may be configured to always report data to the security system upon determining acceleration data. Accordingly, in such variations, the method may proceed to step 407 to initiate the reporting. As another example, the sensor may be configured to report only non-zero amounts of acceleration. Accordingly, in such variations, the sensor may analyze the acceleration data to determine whether a non-zero acceleration is indicated by the acceleration data. If a non-zero acceleration is indicated, the method may proceed to step 407. As yet another example, the sensor may be configured to report based on a comparison of the acceleration data and one or more thresholds. Based on the comparison, the sensor may determine whether at least one (or all) of the one or more thresholds has been exceeded. If at least one threshold has been exceeded, the method may proceed to step 407. As a further example, the sensor may be configured to report based on a comparison between the acceleration data and previous acceleration data for the entry point. Accordingly, in such variations, the sensor may determine a change in acceleration based on the acceleration data and previous acceleration data for the entry point (e.g., determine the difference between a measurement within the acceleration data and a corresponding measurement within the previous acceleration data). The change in acceleration data may be compared to a threshold and, if the change is greater than the threshold, the method may proceed to step 407. If the sensor, at step 405, determines not to report to the security system, the method may proceed to step 401.

At step 407, the sensor may determine or otherwise generate accelerometer reporting data based on the acceleration data. In some examples, the accelerometer reporting data may include the acceleration data. Additionally or alternatively, the accelerometer reporting data may include an accelerometer alarm indication to indicate whether an alarm may need to be triggered based on the acceleration data. The accelerometer alarm indication may be determined based on the results of the various determinations and comparisons performed at step 405. For example, if one or more of the various thresholds discussed in connection with step 405 are exceeded, the accelerometer alarm indication may indicate that an alarm may need to be triggered based on the acceleration data.

Additionally, in some examples, the accelerometer reporting data may include an entry point or node identifier that indicates which entry point or node is being reported. As discussed in connection with FIG. 3, there may be multiple entry points or nodes being monitored and each node may be configured with its own identifier. Accordingly, each sensor that monitors a particular entry point or node may be configured with the identifier of that particular entry point or node. The accelerometer reporting data may include the identifier of that particular entry point or node.

At step 409, the sensor may transmit the accelerometer reporting data. In some examples, this transmission may include transmitting the accelerometer reporting data related to a security system (e.g., security system 319 of FIG. 3) or some other security component (e.g., alarm panel 308 of FIG. 3). After transmitting the accelerometer reporting data, the method may proceed to step 401.

As shown in FIG. 4B, at step 451, a sensor (e.g., security sensor 306 or 307 of FIG. 3) that includes a magnetometer may determine whether to collect data using the magnetometer. In some variations, the sensor may determine whether to collect data using the magnetometer based on a current state of the sensor. This determination may be performed similar to the one described in connection with step 401 of FIG. 4A. Indeed, using the example where the armed, disabled and active states allow for the sensor to collect data using the magnetometer, the sensor may determine its current state. If the sensor determines that the current state is the armed, disarmed or active state, the sensor may proceed to step 453 to initiate the collection of data using the magnetometer. Otherwise, the method may repeat step 451 (or wait a period of time before repeating step 451) until the sensor determines that it is to collect data using the magnetometer. In some instances, instead of repeating step 451 until the sensor determines that it is to collect data using the magnetometer, the method may end.

At step 453, the sensor may determine or otherwise generate magnetic field data for an entry point using the magnetometer. In some examples, the sensor may use the magnetometer to measure the magnetic field at or near the entry point and, based on any of the measurements, generate magnetic field data. Some magnetometers may measure the magnitude of a magnetic field at a point in space. Other magnetometers may measure the magnitude and the direction of a magnetic field at a point in space. Accordingly, the magnetic data may, for example, indicate one or more measurements of a magnitude and/or a direction of the magnetic field at or near the entry point.

At step 455, the sensor may determine whether to report to the security system based on the magnetic field data. The sensor may determine whether to report to the security system in various ways including, for example, similar ways as those described in connection with step 405 of FIG. 3A. For example, the sensor may be configured to always report to the security system upon determining magnetic field data. As another example, the sensor may be configured to report only non-zero amounts of magnetic fields. As yet another example, the sensor may be configured to report based on a comparison between the magnetic field data and one or more thresholds. As a further example, the sensor may be configured to report based on a comparison between the magnetic field data and previous magnetic field data for the entry point. If the sensor determines to report to the security system the method may proceed to step 457. If the sensor determines not to report to the security system, the method may proceed to step 451.

At step 457, the sensor may determine or otherwise generate magnetometer reporting data based on the magnetic field data. In some examples, the magnetometer reporting data may include the magnetic field data. Additionally or alternatively, the magnetometer reporting data may include a magnetometer alarm indication to indicate whether an alarm may need to be triggered based on the magnetic field data. The magnetometer alarm indication may be determined based on the results of the various determinations and comparisons performed at step 455. For example, if one or more of the various thresholds discussed in connection with step 455 are exceeded, the magnetometer alarm indication may indicate that an alarm may need to be triggered based on the magnetic field data.

Additionally, in some examples, the magnetometer reporting data may include an entry point or node identifier that indicates which entry point or node is being reported. As discussed in connection with FIG. 3, there may be multiple entry points or nodes being monitored and each node may be configured with its own identifier. Accordingly, each sensor that monitors a particular entry point or node may be configured with the identifier of that particular entry point or node. The magnetometer reporting data may include the identifier of that particular entry point or node.

At step 459, the sensor may transmit the magnetometer reporting data. In some examples, this transmission may include transmitting the magnetometer reporting data related to a security system (e.g., security system 319 of FIG. 3) or some other security component (e.g., alarm panel 308 of FIG. 3). After transmitting the magnetometer reporting data, the method may proceed back to step 401.

The data reported by the sensors may be analyzed and used to detect various events occurring within the monitored premises and/or take action based on the detected events. While many of the examples provided throughout this disclosure relate to the analysis of data reported by the sensors monitoring different entry points, the data reported by the sensors monitoring the same entry point may be analyzed in some variations. For example, data received from multiple sensors monitoring the same entry point may be analyzed to triangulate a location on the entry point and a knock event may be detected if the location on the entry point is within a range of locations on the entry point a person may be expected to knock.

Some aspects of this disclosure relate to lessening the risk that a false alarm is raised for a monitored premises, such as the premises 300 of FIG. 3. To achieve this, an analysis may be performed on the data reported from the various security components and/or other data related to the security of the premises that has been received or determined by the security system. Based on the analysis, a determination may be made that the analyzed data is indicative of a non-alarm event or a false alarm event. Accordingly, the security system may not trigger an alarm in response to determining that the analyzed data is indicative of a non-alarm event or a false alarm event.

Figure 5:
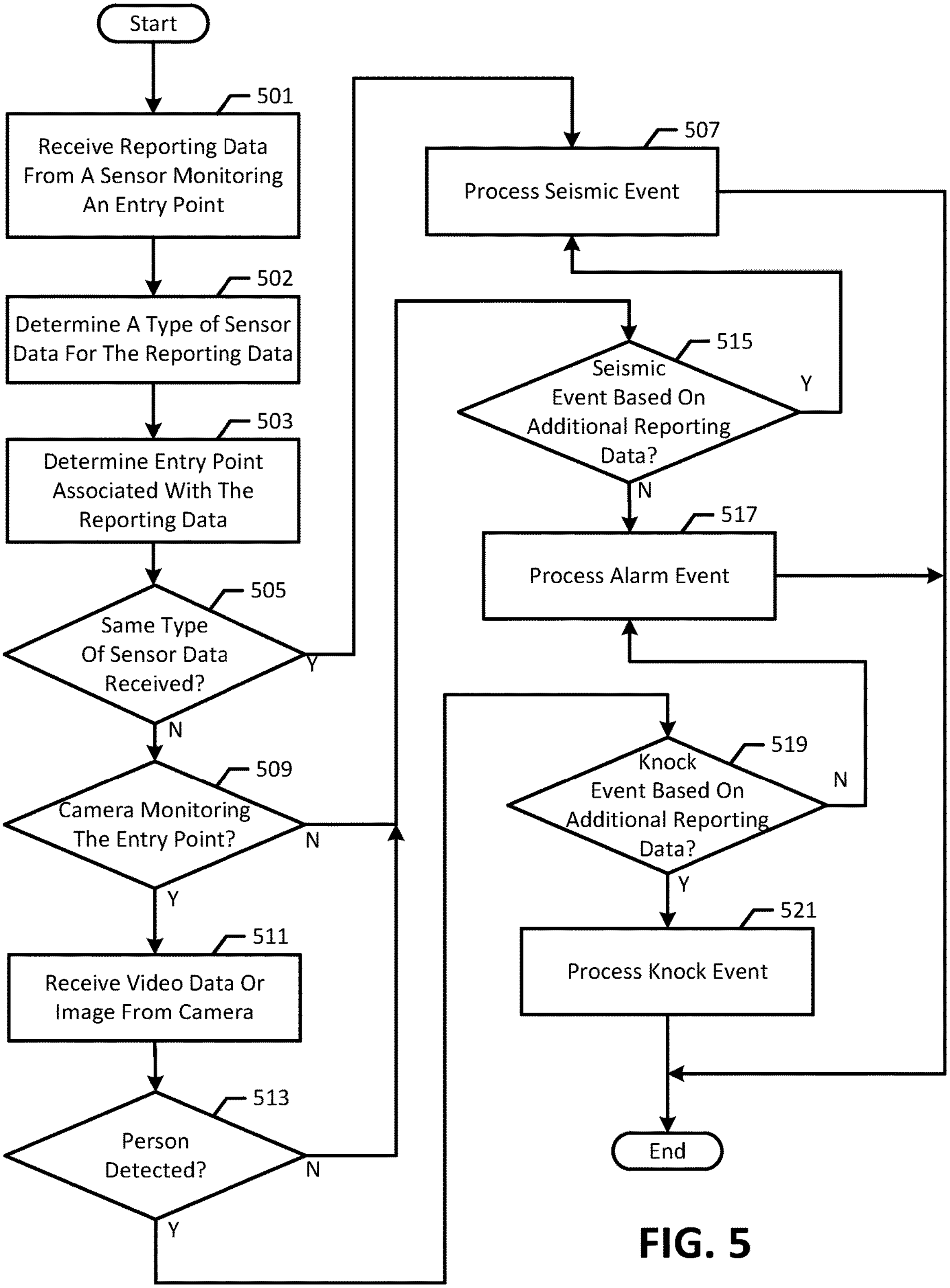
FIG. 5 shows one or more example methods for analyzing data related to the security of a monitored premise that is in accordance with various aspects described herein.

FIG. 5 shows one or more example methods for analyzing data related to the security of a monitored premises. There are various types of data that could be analyzed. For simplicity, the steps of FIG. 5 will be primarily directed to analyzing data from a camera and analyzing data reporting from sensors that include an accelerometer and/or a magnetometer. Accordingly, as will be discussed below in greater detail, the analyzed data may include the data reported from the sensors described in connection with FIGS. 4A and 4B. However, it is noted that other data reported from other security components and/or other security sensors (e.g., a gyroscope, mercury switch, proximity sensor, and/or pressure sensitive door mat) could be analyzed to determine non-alarm events or false alarm events, such as the seismic and knock events that are described throughout this disclosure. The other security components and/or security sensors may be in addition to or in place of the example accelerometer, magnetometer and camera.

There are various types of non-alarm events or false alarm events that may be determined based on an analysis of data related to the security of a monitored premises. For simplicity, the steps of FIG. 5 will be primarily discussed in terms of determining two different types of a non-alarm or a false alarm event: a seismic event and a knock event.

A seismic event may, for example, be indicative that the monitored premises is being affected by an earthquake or some other occurrence (both natural or man-made) that similarly shakes the monitored premises. Other occurrences may include, for example, a detonation of an explosive device, high winds, or a tornado. A seismic event may be determined based on sensors reporting similar data for different entry points of the monitored premises. For example, an earthquake is likely to affect the entire house, so sensors at various entry points are likely to report similar data, such as accelerometer data (e.g., an earthquake is likely to cause the various windows and doors of the premises to shake at similar magnitudes and directions). If the monitored premises is being affected by a seismic event, it may be desirable to not trigger an alarm (e.g., because someone is not trying to break in) and it may be desirable to take a different action based on the seismic event.

A knocking event may, for example, be indicative that a person is knocking on an entry point of the monitored premises (e.g., a deliveryman knocking on a door to deliver a package). A seismic event may be determined based on, for example, a person's knock being of less force than required to break into an entry point. Because a person knocks with less force, the different types of sensors monitoring an entry point may be affected differently than if the person is trying to break in. For example, as a person knocks, an accelerometer may transmit data indicating the door is accelerating along one or more axes based on the knock, but a magnetometer may not record a significant change in magnetic field based on the knock. Similarly, a pressure sensor may not record a significant change in pressure based on the knock. If someone is breaking in, both the accelerometer and the magnetometer (and the pressure sensor) may be recording changes that cause an alarm to be raised. If someone is knocking on the door of the monitored premises, it may be desirable to not trigger an alarm and it may be desirable to take a different action based on the knocking event.

At step 501, one or more computing devices (e.g., security system 319, alarm panel 308, or some other security component configured to analyze data reported from sensors) may receive reporting data from a sensor (e.g., security sensor 306 or security sensor 307 of FIG. 3) monitoring an entry point or node (e.g., a door 304 or a window 305 of FIG. 3) of a monitored premises (e.g., premises 300 of FIG. 3). The one or more computing devices may be configured to receive from each sensor that is communicatively coupled to the one or more computing devices (e.g., receive reporting data from each of the various security components depicted in FIG. 3). In some examples, the data received at step 501 may include accelerometer reporting data transmitted from a sensor that includes an accelerometer (e.g., the accelerometer reporting data transmitted at step 409 of FIG. 4A).

At step 502, the one or more computing devices may determine a type of sensor data for the reporting data was received. The one or more computing devices may determine the type of sensor data received based on the different types of security sensors that are communicatively coupled to the one or more computing devices (e.g., determine a type for each different component among the various security components depicted in FIG. 3). Accordingly, in some variations, the type of sensor data may indicate what type of sensor is reporting or what type of measurement is being reported. For example, if the received reporting data is determined to include accelerometer reporting data or other acceleration data (e.g., the acceleration data determined at step 403 of FIG. 4A), the one or more computing devices may, based on an analysis of the reporting data, determine that the type of sensor data is accelerometer data. As another example, if the received reporting data was received from a sensor that includes an accelerometer, the one or more computing devices may, based on an analysis of the source of the reporting data, determine that the type of sensor data is accelerometer data.

At step 503, the one or more computing devices may determine which entry point or node is associated with the reporting data. As mentioned in connection with step 501, the reporting data may be received from a sensor that is monitoring an entry point or node of a monitored premises. By monitoring this particular entry point or node, the sensor and any reporting data that it transmits may be considered as being associated with the particular entry point or node. Accordingly, the one or more computing devices may determine which entry point or node the reporting data is associated with. This determination may be done in various ways. For example, the one or more computing devices may determine which entry point or node is associated with the reporting data based on an entry point or node identifier included in the reporting data (e.g., as discussed in connection with step 407 of FIG. 4A and step 457 of FIG. 4B). As another example, the one or more computing devices may be configured to receive data from a sensor via a corresponding port or input line. Configuration data stored by the one or more computing devices may map a port or input line identifier to an entry point or node identifier. Accordingly, the one or more computing devices may determine which entry point is associated with the reporting data based on the port or input line through which the reporting data was received and the configuration data.

At step 505, the one or more computing devices may determine whether the same type of sensor data has been received from one or more sensors monitoring one or more other entry points of the monitored premises. In other words, the one or more computing devices may, based on determining that the reporting data received at step 501 is associated with a first entry point or node (e.g., a door 304 of FIG. 3), determine whether at least a second sensor monitoring a second entry point (e.g., one or more of the windows 305 of FIG. 3) has reported the same type of sensor data as the first sensor. For example, if a type of sensor data has been determined for reporting data from the second sensor, the one or more computing devices may determine whether the type of sensor data for the reporting data from the second sensor matches the type of sensor data determined at step 502.

Additionally, the determination of step 505 could be performed based on, for example, whether the same type of sensor data has been received from the second sensor within a threshold amount of time (e.g., a threshold amount of time before and/or after receiving the reporting data at step 501) and/or whether a reporting data cache of the one or more computing devices stores the same type of sensor data from the second sensor. For example, in some instances accelerometer reporting data may have been received from a first sensor (e.g., a sensor performing the method of FIG. 4A). That first sensor may be monitoring a first entry point (e.g., a door 304 of FIG. 3). Accordingly, the one or more computing devices may determine whether accelerometer reporting data has also been received from a second sensor (e.g., another sensor performing the method of FIG. 4A) that is monitoring a second entry point (e.g., a window 305 of FIG. 3).

In some examples, the one or more computing devices may determine that the same type of sensor data has been received upon determining that at least a second sensor monitoring a second entry point (e.g., one or more of the windows 305 of FIG. 3) has reported the same type of sensor data. Accordingly, the method may proceed to step 507. Otherwise, the method may proceed to step 509. However, in some other examples, upon determining that at least a second sensor monitoring a second entry point has reported the same type of sensor data, the one or more computing devices may perform further analysis on the received reporting data.

For example, the one or more computing devices may compare the reporting data received at step 501 to the reporting data received from the second sensor. Based on the comparison, the one or more computing devices may determine whether one or more measurements from the reporting data received at step 501 and one or more measurements from the reporting data received from the second sensor are the same or similar to each other. To provide additional details about such a comparison, an example will be discussed where the type of sensor data is accelerometer reporting data; the reporting data received at step 501 is from a first sensor monitoring a first entry point (e.g., a door 304 of FIG. 3); and a second sensor monitoring a second entry point (e.g., a window 305 of FIG. 3) has also reported accelerometer reporting data. Using this example, the one or more computing devices may compare measurements found within the two sets of reporting data to determine whether the first and second entry points are experiencing a similar acceleration. The similarity may be based on one or more measurement thresholds (e.g., the comparison is used to determine that the door and window are both accelerating at magnitudes along one or more of the same axis that are within a threshold amount from each other). The similarity may be based on the alarm indications included in the compared data (e.g., the comparison is used to determine that both accelerometer alarm indications for the door and the window indicate an alarm should be triggered based on the accelerometer data).

Additionally, the similarity may be based on a comparison between one or more "fingerprints" of data. For example, the similarity may be based on a comparison between a fingerprint of data received from the first sensor over a period of time and a fingerprint of data received from the second sensor over the period of time. For example, each fingerprint of data may include the magnitudes of acceleration over the period of time as received by the respective sensors and the fingerprints may be compared to each other to determine whether the difference between the fingerprints satisfies a threshold.

Further, in some examples, additional data may be compared to the data received from the sensors. For example, the security system may receive one or more fingerprint templates from a local office, monitoring entity or other source to which the fingerprints of data received from the sensors can be compared. These fingerprint templates may be directed to particular false alarm or non-alarm events. As one example, a fingerprint template may represent an expected pattern of data for a knock event, which may include data spikes for the occurrences of two or more separate knocks and gaps between each data spike (e.g., 300 ms or so between each spike) for the period of time between each of the separate knocks. Each fingerprint of data may be compared to the fingerprint template to determine whether the difference between fingerprints of data and the fingerprint template satisfies a threshold. Use of a fingerprint template, for example, may allow for the security system to detect particular types of events from others (e.g., a template for a knock event could be different from other types of false alarm or non-alarm events, such as a wind event, which may be represented by a fingerprint template that includes a single longer data spike).

Based on the comparison (e.g., if the comparison results in a determination that the compared data is the same or similar to each other; if the comparison results in a determination that the compared data are within a threshold from each other; and/or if the comparison results in a determination that a threshold number or all of the alarm indications indicate an alarm should be triggered), the one or more computing devices may determine that the same type of sensor data has been received and, thus, may proceed to step 507. Otherwise, the method may proceed to step 509.

Moreover, in some variations, the one or more computing devices may require that the same type of sensor data be received from sensors monitoring a threshold number of other entry points (e.g., two other entry points, all other entry points, etc.). For example, the above-discussed example was based on the reporting data being received from sensors monitoring two entry points (e.g., a first sensor monitoring the first entry point and a second sensor monitoring a second entry point). The one or more computing devices may, if the threshold is two other entry points, be configured to require that the same type of sensor data be received from sensors monitoring at least two other entry points. In other words, if the reporting data was received from a first sensor monitoring a first entry point (e.g., a door 304 of FIG. 3), the computing device may require that the same type of sensor data be received from at least a second sensor monitoring a second entry point (e.g., a first window from the windows 305 of FIG. 3) and a third sensor monitoring a third entry point (e.g., a second window from the windows 305 of FIG. 3). Upon determining that the same type of sensor data has been received from sensors monitoring the threshold number of other entry points, the one or more computing devices may determine that the same type of sensor data has been received and, thus, may proceed to step 507. Otherwise, the method may proceed to step 509.

Further, in such variations where the one or more computing devices require the same type of sensor data be received from sensors monitoring a threshold number of other entry points, the one or more computing devices may compare the reporting data from each sensor to each other in order to determine whether the reporting data from each sensor is the same or similar to the reporting data of the other sensors. The similarity may be based on one or more measurement thresholds and/or the alarm indications included in the compared data. Based on the comparison, the one or more computing devices may determine that the same type of sensor data has been received and, thus, may proceed to step 507. Otherwise, the method may proceed to step 509.

At step 507, the one or more computing devices may process a seismic event. As discussed above, a seismic event is considered one of the types of non-alarm or false alarm events. Accordingly, the one or more computing devices may respond to the reporting data received at step 501 by processing a seismic event as a non-alarm or false alarm. Processing the seismic event may include not triggering an alarm based on the reporting data received at step 501 and/or the reporting data compared at step 505. Processing the seismic event may include generating and/or storing a seismic event data record that, for example, indicates that a seismic event occurred at the monitored premises. The seismic event data record may include, for example, the reporting data received from a sensor monitoring the entry point (discussed at step 501); the reporting data received from one or more sensors monitoring one or more other entry points (discussed at step 505); one or more time stamps indicating the times at which the various sets of reporting data were received; a seismic event identifier for the seismic event data record; and/or a seismic event confidence value.

In some variations, the seismic event confidence value may be determined based on how many sensors and/or entry points reported the same type of sensor data. For example, if the seismic event confidence value is determined on a 0-10 scale, an instance where only a sensor for a door of the premises and a sensor for one of the windows of the monitored premises are determined to have reported the same type of sensor data may have a seismic event confidence value of 2. An instance where a sensor for each door and window of the monitored premises is determined to have reported the same type of sensor data may have a seismic event confidence value of 10.

Other types of data may also be stored within the seismic event data record. For example, video data (e.g., video clips) or images from cameras monitoring one or more entry points of the monitored premises may be stored as part of the seismic event data record (e.g., an image or video clip from a camera monitoring the entry point associated with the reporting data received at step 501, and/or one or more images or video clips from one or more cameras monitoring the other entry points from which reporting data was received or compared at step 505).

Processing the seismic event may also include transmitting one or more notifications related to the seismic event. For example, the seismic event data record or some other notification indicating that a seismic event has occurred at the monitored premises may be transmitted to one or more devices (e.g., mobile device 320, local office 302, monitoring entity 317, television 303, alarm panel 308, and/or web portal server 318).

At step 509, the one or more computing devices may determine whether a camera is monitoring the entry point associated with the reporting data received at step 501. This determination may be performed based on configuration data stored in a medium that is accessible to the one or more computing devices. If a camera is monitoring the entry point, the method may proceed to step 511. Otherwise, the method may proceed to step 515.

At step 511, the one or more computing devices may receive video data or an image from the camera monitoring the entry point. Receiving the video data or the image from the camera may include accessing a cache to retrieve the most recent image or video data received from the camera. In some instances, receiving the video data or the image from the camera may include requesting the camera capture and transmit the image or video data. Further, in some instances, receiving the video data or the image from the camera may include changing the state of the camera to be in an active state and then requesting the camera capture and transmit the image and/or video data.

At step 513, the one or more computing devices may determine whether a person is detected based on the video data or the image. This determination may be based on one or more recognition techniques or other computer learning algorithms. For example, the image or video data may be processed through a classifier (e.g., a classifier using a support vector machine or neural network) configured to determine whether a person is likely present in the image of video data. The image or video data may be processed through a face recognition algorithm to determine that a person is detected based on the detection of a face within the image or video data. The image or video data may be processed through various filtering or segmentation algorithms including, for example, background segmentation algorithms, edge filtering algorithms, skin tone filtering algorithms, and the like. If the one or more computing devices determine that a person is detected based on the video data or the image, the method may proceed to step 519. Otherwise, the method may proceed to step 515.

At step 515, the one or more computing devices may determine whether to process a seismic event based on additional reporting data received from one or more sensors, which are monitoring the entry point associated with the reporting data received at step 501. For example, in addition to being monitored by the sensor discussed at step 501, the entry point may be monitored by one or more additional sensors that collect different measurements at or near the entry point. Accordingly, each of these one or more other sensors may be transmitting its own reporting data to the one or more computing devices. The one or more computing devices may analyze some or all of the reporting data received from these other sensors to determine whether to process a seismic event. As another example, in addition to the reporting data received at step 501, the sensor may be generating additional types of reporting data (e.g., if the sensor includes both an accelerometer and a magnetometer, the sensor may be generating both accelerometer reporting data and magnetometer reporting data). The one or more computing devices may analyze each of these additional types of reporting data to determine whether to process a seismic event.

For example, in some variations, the one or more computing devices may receive and analyze magnetometer reporting data from a sensor monitoring the entry point. In some variations, the magnetometer reporting data may include one or more measurements of a magnetic field at or near the entry point. These one or more measurements may be compared to previous magnetic field measurements for the entry point to determine whether the magnetic field has changed for the entry point. The determination may be based on one or more thresholds (e.g., if one or more measurements and the previous measurements indicate a difference in magnitude greater than a threshold, it may be determined that the magnetic field has changed). Additionally, in some variations, the magnetometer reporting data may include a magnetometer alarm indication. If the magnetometer alarm indication indicates that an alarm should be triggered based on the magnetic field data, the one or more computing devices may determine that the magnetic field has changed. Accordingly, if the one or more computing devices determine that the magnetic field has changed, the analysis of the additional reporting data has indicated that a seismic event should not be processed. The method, therefore, may proceed to step 517, in order to process an alarm event. If the magnetic field has not changed, the analysis of the additional reporting data has indicated that a seismic event should be processed. The method, therefore, may proceed to step 507, in order to process a seismic event.

For example, in some embodiments, the one or more computing devices may receive and analyze pressure sensor reporting data from a pressure sensor monitoring the entry point (e.g., a pressure sensor discussed below in connection with FIGS. 8A and 8B). In some variations, the pressure sensor reporting data may include one or more measurements of a pressure measured via a pressure plate of the pressure sensor. When the pressure plate is between two surfaces (e.g., the pressure plate is between two sashes of a closed window), the measurements may indicate a high pressure. When the pressure plate is moved from between the two surfaces (e.g., the pressure plate is not between the two sashes of the window, such as when the window is open), the measurements may indicate a low pressure. If the measurements indicate a high pressure, the one or more computing devices may determine to process a seismic event. If the measurements indicate a low pressure, the one or more computing devices may determine not to process a seismic event. Additionally, in some variations, the pressure sensor reporting data may include a pressure sensor alarm indication. If the pressure sensor alarm indication indicates that an alarm should be triggered based on the pressure sensor data, the one or more computing devices may determine not to process a seismic event. Accordingly, if the one or more computing devices determine that a seismic event should be processed. The method, therefore, may proceed to step 507, in order to process a seismic event. If the seismic event should not be processed, the method may proceed to step 517, in order to process an alarm event.

At step 517, the one or more computing devices may process an alarm event. Processing the alarm event may include triggering an alarm based on the reporting data received at step 501, the reporting data compared at step 505, and/or the additional reporting data analyzed at step 515. Processing the alarm event may include generating and/or storing an alarm event data record. The alarm event data record may include, for example, the reporting data received from a sensor monitoring the entry point (discussed at step 501); the reporting data received from one or more sensors monitoring one or more other entry points (discussed at step 505); the additional reporting data received from one or more sensors monitoring the entry point (discussed at step 519); one or more time stamps indicating the times at which the various sets of reporting data were received; and/or an alarm event identifier for the alarm event data record.

Other types of data may also be stored within the alarm event data record. For example, images or video clips from cameras monitoring one or more entry points of the monitored premises may be stored as part of the alarm event data record (e.g., an image or video clip from a camera monitoring the entry point associated with the reporting data received at step 501, and/or one or more images or video clips from one or more cameras monitoring the other entry points from which reporting data was received or compared at step 505).

Processing the alarm event may also include transmitting one or more notifications related to the alarm event. For example, the alarm event data record or some other notification indicating that an alarm event has occurred at the monitored premises may be transmitted to one or more devices (e.g., mobile device 320, local office 302, monitoring entity 317, television 303, alarm panel 308, and/or web portal server 318).

At step 519, the one or more computing devices may determine whether to process a knock event based on additional reporting data received from one or more sensors, which are monitoring the entry point associated with the reporting data received at step 501. For example, in addition to being monitored by the sensor discussed at step 501, the entry point may be monitored by one or more additional sensors that collect different measurements at or near the entry point. Accordingly, each of these one or more other sensors may be transmitting its own reporting data to the one or more computing devices. The one or more computing devices may analyze some or all of the reporting data received from these other sensors to determine whether to process a knock event. As another example, in addition to the reporting data received at step 501, the sensor may be generating additional types of reporting data (e.g., if the sensor includes both an accelerometer and a magnetometer, the sensor may be generating both accelerometer reporting data and magnetometer reporting data). The one or more computing devices may analyze each of these additional types of reporting data to determine whether to process a knock event.

For example, in some variations, the one or more computing devices may receive and analyze magnetometer reporting data from a sensor monitoring the entry point. In some variations, the magnetometer reporting data may include one or more measurements of a magnetic field at or near the entry point. These one or more measurements may be compared to previous magnetic field measurements for the entry point to determine whether the magnetic field has changed for the entry point. The determination may be based on one or more thresholds (e.g., if one or more measurements and the previous measurements indicate a difference in magnitude greater than a threshold, it may be determined that the magnetic field has changed). Additionally, in some variations, the magnetometer reporting data may include a magnetometer alarm indication. If the magnetometer alarm indication indicates that an alarm should be triggered based on the magnetic field data, the one or more computing devices may determine that the magnetic field has changed. Accordingly, if the one or more computing devices determine that the magnetic field has changed, the analysis of the additional reporting data has indicated that a knock event should not be processed. The method, therefore, may proceed to step 517, in order to process an alarm event. If the magnetic field has not changed, the analysis of the additional reporting data has indicated that a knock event should be processed. The method, therefore, may proceed to step 521, in order to process a knock event.

For example, in some embodiments, the one or more computing devices may receive and analyze pressure sensor reporting data from a pressure sensor monitoring the entry point (e.g., a pressure sensor discussed below in connection with FIGS. 8A and 8B). In some variations, the pressure sensor reporting data may include one or more measurements of a pressure measured via a pressure plate of the pressure sensor. If the measurements indicate a high pressure, the one or more computing devices may determine to process a knock event. If the measurements indicate a low pressure, the one or more computing devices may determine not to process a knock event. Additionally, in some variations, the pressure sensor reporting data may include a pressure sensor alarm indication. If the pressure sensor alarm indication indicates that an alarm should be triggered based on the pressure sensor data, the one or more computing devices may determine not to process a knock event. Accordingly, if the one or more computing devices determine that a knock event should be processed. The method, therefore, may proceed to step 521, in order to process a knock event. If the seismic event should not be processed, the method may proceed to step 517, in order to process an alarm event.

At step 521, the one or more computing devices may process a knock event. As discussed above, a knock event may be considered one of the non-alarm or false alarm events. Accordingly, the one or more computing devices may respond to the reporting data received at step 501 by processing a knock event as a non-alarm or false alarm. Processing the knock event may include not triggering an alarm based on the reporting data received at step 501, the reporting data compared at step 505, and/or the additional reporting data analyzed at step 519. Processing the alarm event may include generating and/or storing a knock event data record that, for example, indicates that a knock event occurred at the monitored premises. The knock event data record may include, for example, the reporting data received from a sensor monitoring the entry point (discussed at step 501); the reporting data received from one or more sensors monitoring one or more other entry points (discussed at step 505); the additional reporting data received from one or more sensors monitoring the entry point (discussed at step 519); one or more time stamps indicating the times at which the various sets of reporting data were received; a knock event identifier for the knock event data record; and/or a knock event confidence value.

In some variations, the knock event confidence value may be determined based on a confidence value determined at step 513 and/or an amount of change determined at step 519. For example, one or more of the algorithms performed in connection with the determination at step 513 may have resulted in an indication of how likely a person is detected based on the video data or the image. In this example, the knock event confidence value may be set to a value based on that indication. As another example, the determination performed at step 519 may have determined there was a change in the magnetic field but it was less than a threshold amount. The knock event confidence value may be set based on the amount of the determined change in magnetic field. In an instance where the knock confidence value is determined on a 0-10 scale, if the change is determined to be a 1% change, the value of the knock event confidence value may be 8. If the change is determined to be a 5% change, the value of the knock event confidence value may be set to 2.

Other types of data may also be stored within the knock event data record. For example, images or video clips from cameras monitoring one or more entry points of the monitored premises may be stored as part of the knock event data record (e.g., an image or video clip from a camera monitoring the entry point associated with the reporting data received at step 501, and/or one or more images or video clips from one or more cameras monitoring the other entry points from which reporting data was received or compared at step 505).

Processing the knock event may also include transmitting one or more notifications related to the knock event. For example, the knock event data record or some other notification indicating that a knock event has occurred at the monitored premises may be transmitted to one or more devices (e.g., mobile device 320, local office 302, monitoring entity 317, television 303, alarm panel 308, and/or web portal server 318).

Figure 6:
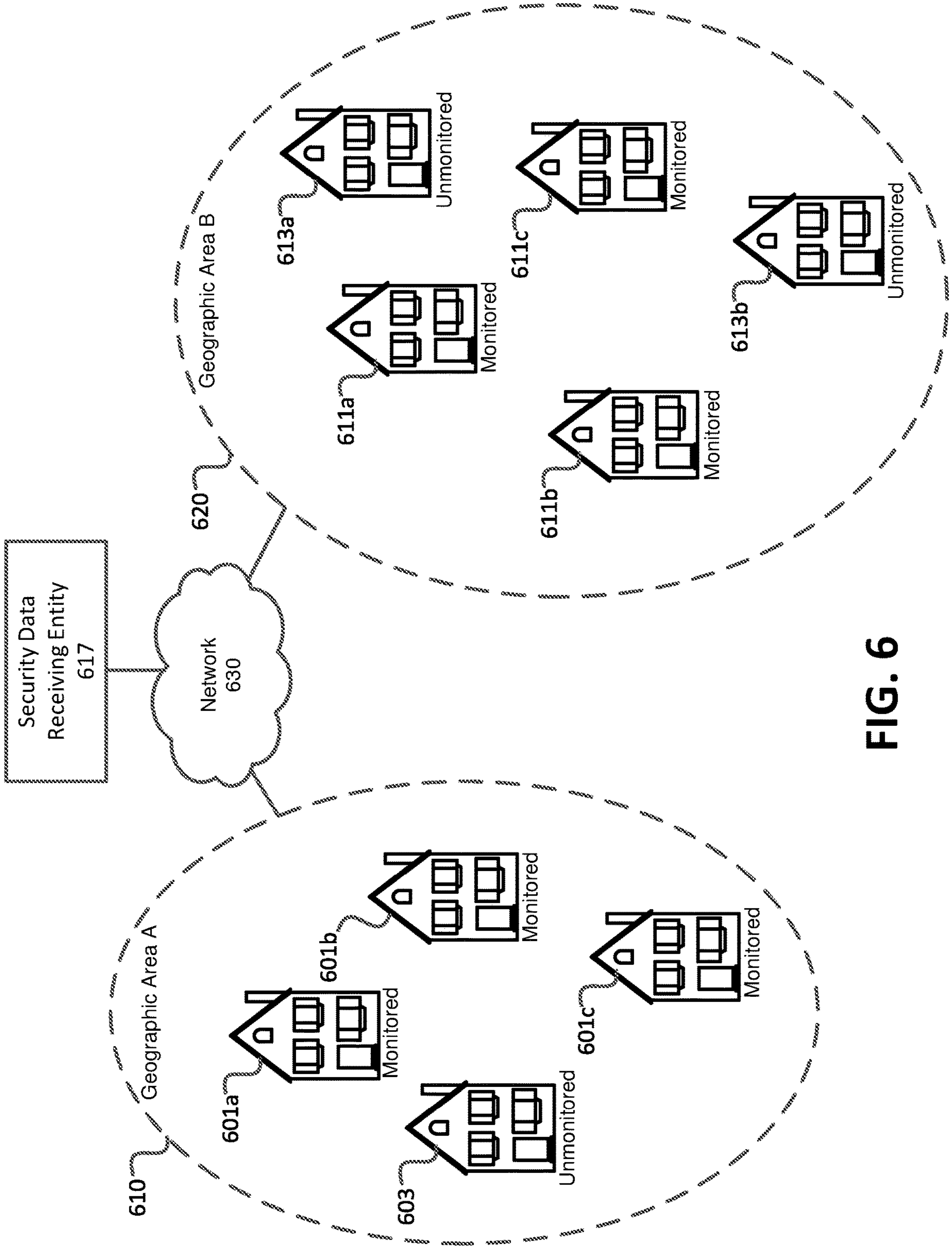
FIG. 6 shows another example operating environment in which one or more of the various features described herein may be implemented.

As discussed in connection with FIG. 5, the one or more computing devices may transmit data related to various events that occur at the monitored premises to one or more devices (see, e.g., steps 507, 517 and 521 of FIG. 5). In some examples, this data may be collected by a receiving entity (e.g., local office 302 and/or monitoring entity 317 of FIG. 3) and compared to data received from other premises and/or other geographic areas. Accordingly, the receiving entity may be in communication with multiple monitored premises that are located within one or more geographic areas. FIG. 6 shows another example operating environment in which one or more of the various features described herein may be implemented. In particular, FIG. 6 shows an example operating environment in which a particular receiving entity (e.g., security data receiving entity 617) is in communication with multiple premises. Accordingly, as depicted by items 610 and 620 of FIG. 6, there are a number of premises at geographic area A (e.g., Washington, D.C.) and a number of premises at geographic area B (e.g., Raleigh, VA).

As shown in FIG. 6, there are a set of monitored premises 601*a*, 601*b* and 601*c* and an unmonitored premise 603 within geographic area A. Similarly, within geographic area B, there are a set of monitored premises 611*a*, 611*b* and 611*c*, and a set of unmonitored premises 613*a* and 613*b*. Monitored premises are being provided with a security monitoring service. Each of the monitored premises may be similar to the premises 300 of FIG. 3 and may include similar security components (e.g., each monitored premise in FIG. 5 may include a security system 319, security sensors 306 and 307, cameras 310, lights 315, alarm panel 308, and the like). The security sensors within each monitored premise may be performing the methods described in connection with FIGS. 4A and 4B. The security system within each monitored premise may be performing the method described in connection with FIG. 5. Unmonitored premises may not be provided with a security monitoring service (or may have unenrolled from the security monitoring service and, accordingly, may include the security components), but may located within the same geographic region of the monitored premises.

In some examples, the monitored and unmonitored premises may be provided with services in addition to or alternatively from security monitoring service. For example, one or more of the monitored premises depicted in FIG. 6 and one or more of the unmonitored premises depicted in FIG. 6 may be provided with one or more content or information services via a distribution network (e.g., information distribution network 100 of FIG. 1). Additionally, the security monitoring service and the one or more content or information services may be provided by the same service provider (e.g., the service provider that operates the distribution network 100 may provide the home security service in addition to the one or more content or information services). In some examples, the content or information services may include services for video-on demand content, television content, Internet access, telephone, and the like.

As also depicted in FIG. 6, the premises at the various geographic areas may be in communication with a security data receiving entity 617 via a network 630. Network 630 may be any of the networks discussed in connection with FIGS. 1-3. The security data receiving entity 617 may be, for example, monitoring entity 317 of FIG. 3, local office 302 of FIG. 3, or some other entity is capable of receiving data related to the security of the monitored premises.

Figure 7A:
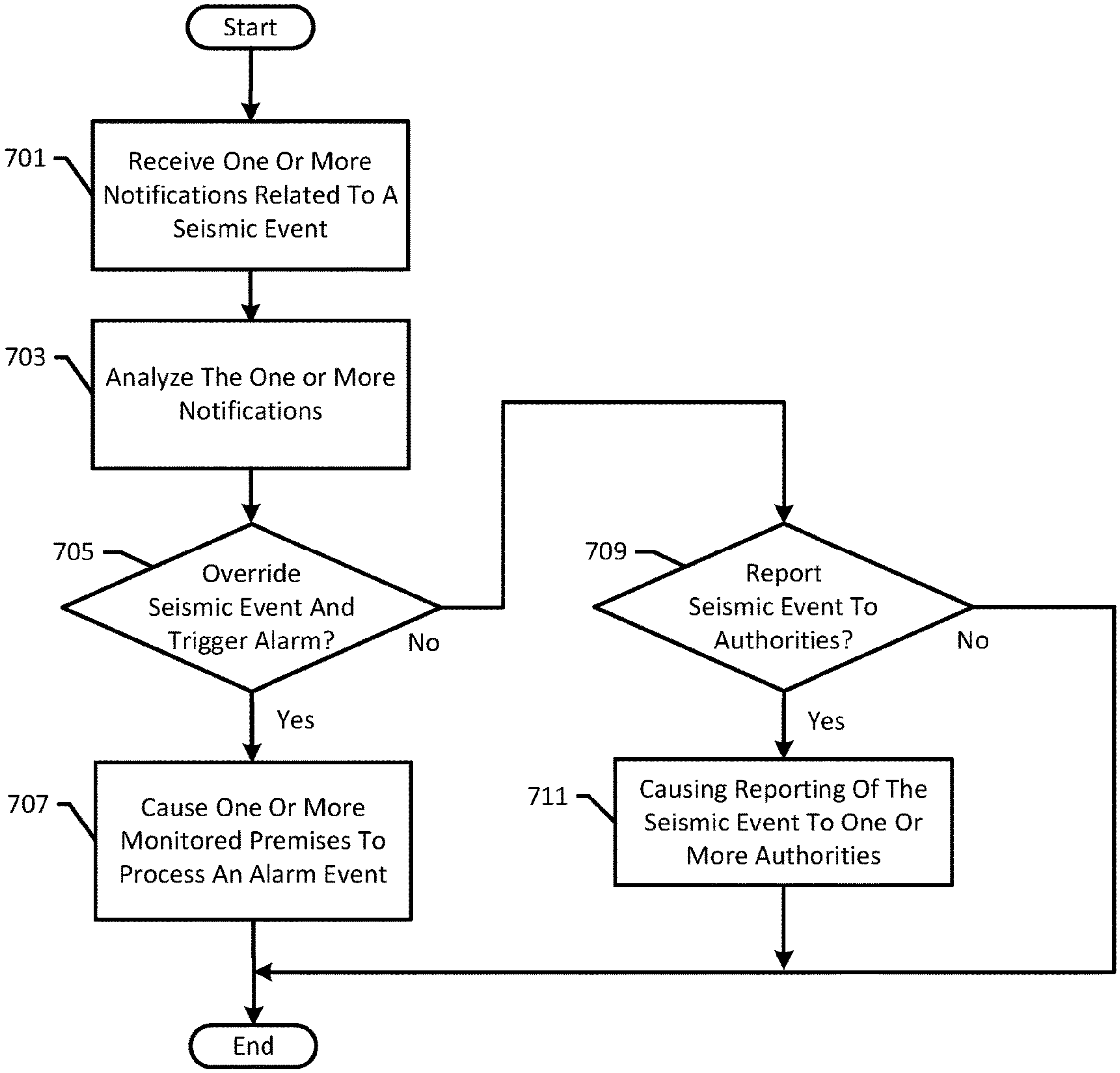
FIG. 7A shows one or more example methods for analyzing data related to the security of monitored premises at a geographic location that is in accordance with various aspects described herein
Figure 7B:
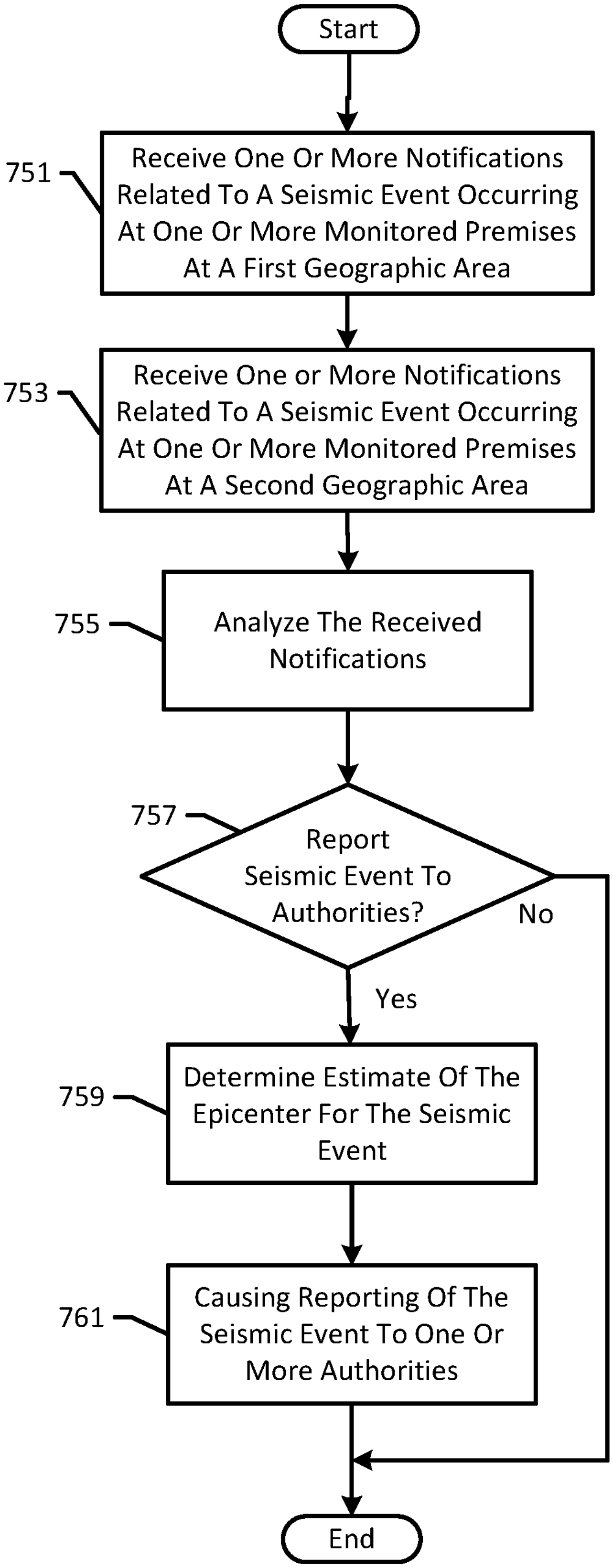
FIG. 7B shows one or more example methods for analyzing data related to the security of multiple premises at two or more geographic locations that is in accordance with various aspects described herein.

The security data receiving entity 617 may communicate with various devices at the geographic areas in connection with providing the security monitoring service to each premise. For example, the security system (e.g., security system 319 of FIG. 3) of each monitored premises (e.g., premises 601*a*, 601*b*, 601*c*, 611*a*, 611*b* and 611*c*) may transmit data related to the security of the monitored premise to the security data receiving entity 617. Such data may include, for example, information describing an alarm event triggered by the security system 319, information describing a non-alarm or false alarm event determined by the security system 319, or any of the other data discussed in connection with FIGS. 3, 4A, 4B and 5. Additionally, each geographic region may also have one or more local offices (e.g., local office 302 of FIG. 3). The security data receiving entity 617 may be in communication with the one or more local offices (e.g., in examples where the security data receiving entity 617 is the monitoring entity 317 or some other entity capable of receiving data related to the security of the monitored premises). Each local office may transmit data related to the security of each monitored premise to the security data receiving entity 617. The security data receiving entity 617 may use the data transmitted from one or more security systems of the monitored premises and/or the local offices to perform further analysis and, in some variations, take further action based on the analysis. FIGS. 7A and 7B provide example methods that may be implemented by one or more computing devices of the security data receiving entity 617.

In particular, FIG. 7A shows one or more example methods for analyzing data related to the security of monitored premises at a geographic location. For simplicity, FIG. 7A will be discussed in terms of analyzing data related to one or more seismic events that have been received from a geographic area (e.g., geographic area A of FIG. 6). However, it is noted that the analysis could be based on data for other types of events and, based on the analysis, similar actions performed (e.g., other events could form the basis for transmitting a notification to an authority associated with the other events or the geographic area).

At step 701, one or more computing devices may receive one or more notifications related to a seismic event. In some instances, these notifications may be received from one or more monitored premises located within the same geographic region (e.g., geographic region A of FIG. 6). Accordingly, in some examples, these notifications may be, for example, the data transmitted at step 507 of FIG. 5 (e.g., a seismic event data record). Additionally, these notifications may be received from other devices that are associated with the monitored premises of the geographic region (e.g., received from a local office 302 of FIG. 302, which initially receives notifications from the monitored premises and, based on certain criteria, forwards the notifications to the one or more computing devices).

At step 703, the one or more computing devices may analyze the one or more notifications. The analysis, for example, may be to determine various properties of the seismic event. Such properties may include, for example, a count of the number of notifications received from the monitored premises of the geographic region, a count of the number of monitored premises being affected by the seismic event based on the received notifications, and the like. Additionally or alternatively, the properties may include a strength of the seismic event based on data within the received notifications. For example, if each notification includes a seismic event data record, there may be measurements in each seismic event data record usable to determine a strength of the seismic event. The properties may include a length of time the seismic event has occurred based on data within the received notifications and/or the time at which the notifications were received. For example, if each notification includes a seismic event data record, the length of time may be determined based on the earliest time stamp included in the seismic event data records and a time for which the final notification was received. As another example, the length of time may be determined based on the time for which the first notification was received and the time for which the final notification was received. It is noted that other types of properties could be determined based on the data included in a notification.

At step 705, the one or more computing devices may determine whether to override a seismic event and cause alarms to be triggered at one or more of the monitored premises of the geographic area. In some variations, for example, a seismic event may be overridden if the number of received notifications is less than a threshold (e.g., if less than three notifications have been received for the geographic area then the seismic event may be overridden). A seismic event may be overridden if, within the geographic area, the number of monitored premises being affected by the seismic event is less than a threshold (e.g., if less than two different monitored premises are being affected then the seismic event may be overridden). Accordingly, if the one or more computing devices determine to override the seismic event and trigger an alarm, the method may proceed to step 707. Otherwise, the method may proceed to step 709. It is noted that in some variations, the one or more computing devices may never determine to override a seismic alert.

At step 707, the one or more computing devices may cause one or more monitored premises to process an alarm event. For example, a command to process an alarm event may be transmitted to a security system of each monitored premises that is being affected by the seismic event (e.g., each monitored premises identified in the received notifications). Responsive to receiving the command, one or more computing devices of each security system may process a seismic event similarly to the processes described at step 507 of FIG. 5.

At step 709, the one or more computing devices may determine whether to report the seismic event to one or more authorities. For example, the one or more computing devices may determine whether to report the seismic event based on the strength of the seismic event and/or length of time the seismic event has occurred (e.g., report if the strength and/or length of time is above a threshold). Additionally, as part of this determination, the one or more computing devices may determine which authorities to contact. In some examples, the strength and/or length of time of the seismic event may be used to determine which authorities to contact. For example, if the strength is below a strength threshold, only local authorities may be contacted (e.g., the local police and/or local fire department are to be contacted). If the strength is above the strength threshold, the local authorities and an earthquake authority may be contacted (e.g., the local police, fire department and/or the National Earthquake Information Center (NEIC) are to be contacted). Moreover, determining whether to report the seismic event and/or determining which authority to contact may be based on any of properties of the seismic event determined from the analysis performed at step 703. For example, if the number of monitored premises is below a threshold, the local authorities and the earthquake authority may be contacted. Accordingly, if it is determined to report the seismic event, the method may proceed to step 711. Otherwise, the method may end. It is noted that in some variations, the one or more computing devices may always determine to report the seismic event.

At step 711, the one or more computing devices may cause reporting of the seismic event to the one or more authorities. In some examples, causing reporting of the seismic event to the one or more authorities may include transmitting or otherwise initiating some communication to a computing device associated with the one or more authorities. For example, a message, such as an e-mail, may be transmitted to each authority that is to be contacted (e.g., e-mail the local police, e-mail the local fire department, e-mail the NEIC, etc.). The message may include the one or more notifications received at step 701. A phone call may be initiated or otherwise conducted with each authority. The phone call may be an automated call that provides a description of the seismic event (e.g., strength, length of time, number of premises effected, identification of the geographic area, time the seismic event started, etc.) via an automated dialog generated by the one or more computing devices, or the phone call may be initiated by the one or more computing devices but the dialog may conducted by an operator.

FIG. 7B shows one or more example methods for analyzing data related to the security of multiple premises at two or more geographic locations. For simplicity, FIG. 7B will be discussed in terms of analyzing data related to seismic events that have been received from two geographic areas (e.g., geographic area A and geographic area B of FIG. 6). However, it is noted that the analysis could be based on data for other types of events or from data received from premises located in other geographic areas and, based on the analysis, similar actions performed (e.g., other events could form the basis for transmitting a notification to an authority associated with the other events or the geographic areas involved).

At step 751, one or more computing devices may receive one or more notifications related to a seismic event occurring at one or more monitored premises at a first geographic area. In some examples, this step may proceed similar to step 701 of FIG. 7A.

At step 753, the one or more computing devices may receive one or more notifications related to a seismic event occurring at one or more monitored premises at a second geographic area. In some examples, this step may proceed similar to step 701 of FIG. 7A, but be for a geographic area (e.g., geographic area B of FIG. 6) different from the first geographic area.

At step 755, the one or more computing devices may analyze the notifications received at step 751 and 753. This analysis may include analyzing the notifications received at step 751 similar to step 703 of FIG. 7A to, for example, determine various properties of the seismic event for the first geographic area. The notifications received at step 753 may also be analyzed similarly to step 703 of FIG. 7B to, for example, determine various properties of the seismic event for the second geographic area.

At step 757, the one or more computing devices may determine whether to report the seismic event to one or more authorities. In some examples, this step may proceed similar to step 709 of FIG. 7A and, in some examples, be based on the properties of the seismic event for the first geographic region and the properties of the seismic event for the second geographic region.

At step 759, the one or more computing devices may determine an estimate of the epicenter for the seismic event. In some variations, the estimate of the epicenter may indicate a geographic region that is likely to include the epicenter of the seismic event. Determining an estimate of the epicenter may be based on an analysis of the properties of the seismic event for the first geographic region and the properties of the seismic event for the second geographic. For example, based on the distance and direction between the two geographic areas, the strength of the seismic event for the first geographic region, and the strength of the seismic event for the second geographic region, an estimate of the epicenter may be determined. Indeed, using an example where the first geographic area is Washington, DC and the second geographic area is Raleigh, VA, based on Washington, D C and Raleigh, VA being separated by a number of miles, based on Raleigh, VA being generally south from Washington, DC, and if Washington, DC experienced a higher strength of the seismic event than Raleigh, VA, the epicenter is likely closer to Washington, DC than Raleigh, VA. As another example, based on the distance and direction between the two geographic areas, the earliest time of the seismic event for the first geographic area and the earliest time of the seismic event for the second geographic area, an estimate of the epicenter may be determined (e.g., if Washington, DC was effected by the seismic event before Raleigh, VA, the epicenter is likely closer to Washington, DC than Raleigh, VA). The various properties may be used in combination to determine the estimate of the epicenter. For example, if both the strength and earliest time properties mentioned above are used, the both properties may be placed into an earthquake model as input variables to determine an estimate of the epicenter. Additionally, it is noted that if notifications related to the seismic event for additional geographic areas have been received and analyzed, a more accurate estimate of the epicenter may be determined (e.g., determining the estimate of the epicenter may be based on notifications received from three or more geographic regions).

At step 761, the one or more computing devices may cause reporting of the seismic event to the one or more authorities. This step may proceed similar to step 711 of FIG. 7A and the estimate of the epicenter for the seismic event may be provided to the one or more authorities. Accordingly, the one or more computing devices may cause (e.g., based on the transmission of one or more messages or the initiation of a call) the seismic event and/or the estimate of the epicenter to be reported to local authorities in the first geographic region, local authorities in the second geographic region and/or earthquake authorities.

Additionally, although step 711 of FIG. 7A and step 761 of FIG. 7B are directed to causing reporting of the seismic event to certain types of authorities, other entities could also be contacted. For example, a message could be transmitted to users associated with the monitored premises (e.g., a SMS message to a mobile phone of each user) to inform them a seismic event is occurring. Additionally or alternatively, a command could be transmitted to monitored premises within the affected geographic areas to, for example, trigger an alarm with a sound that is indicative of a seismic event or trigger an alert level specific to a seismic event (e.g., accelerometer and magnetometer sensors may be deactivated, while other sensors, such as video cameras, are or remain active).

Figure 8A:
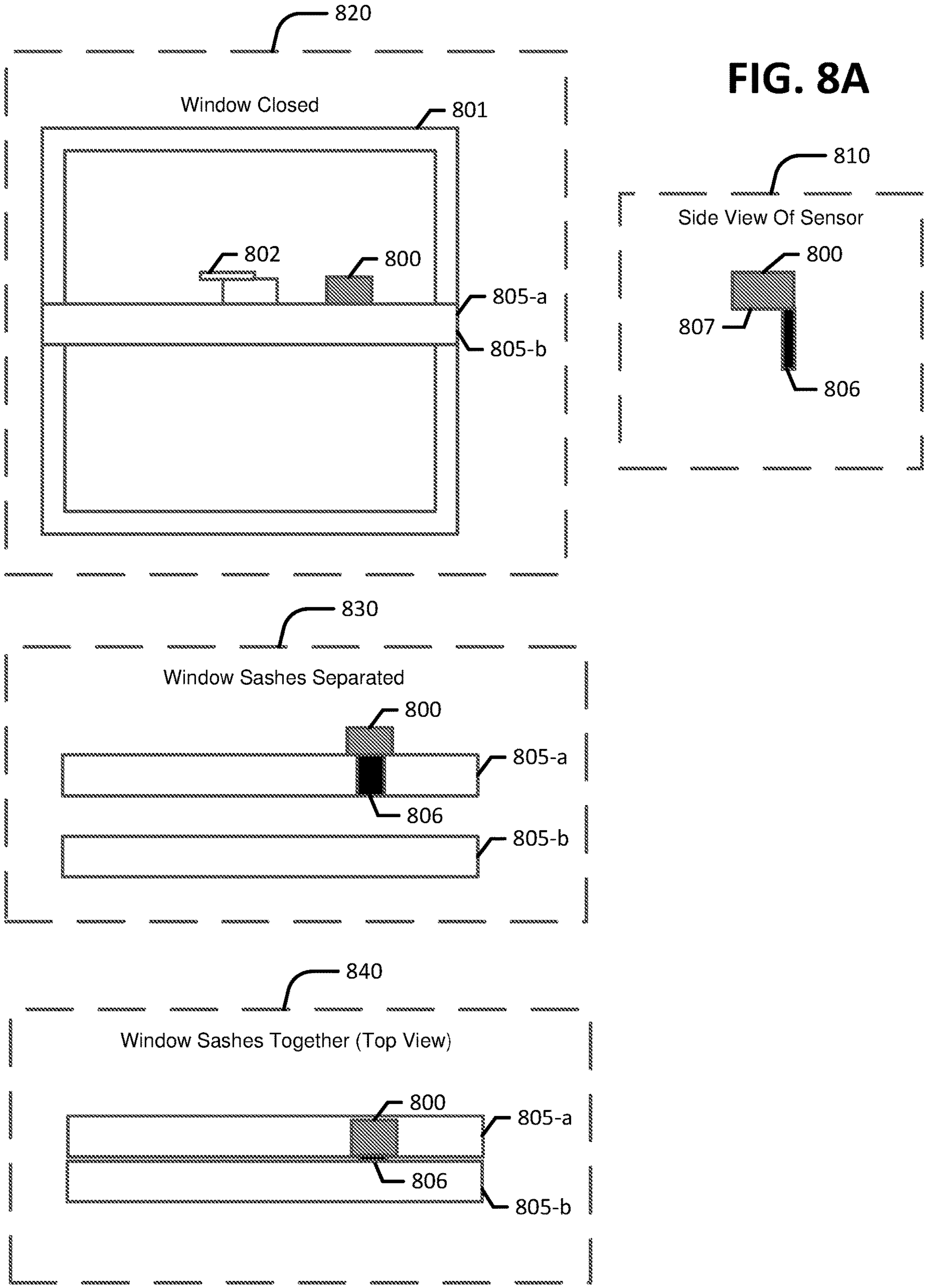
FIGS. 8A and 8B show various views for one or more embodiments for a security sensor that may be used in various embodiments described herein.
Figure 8B:
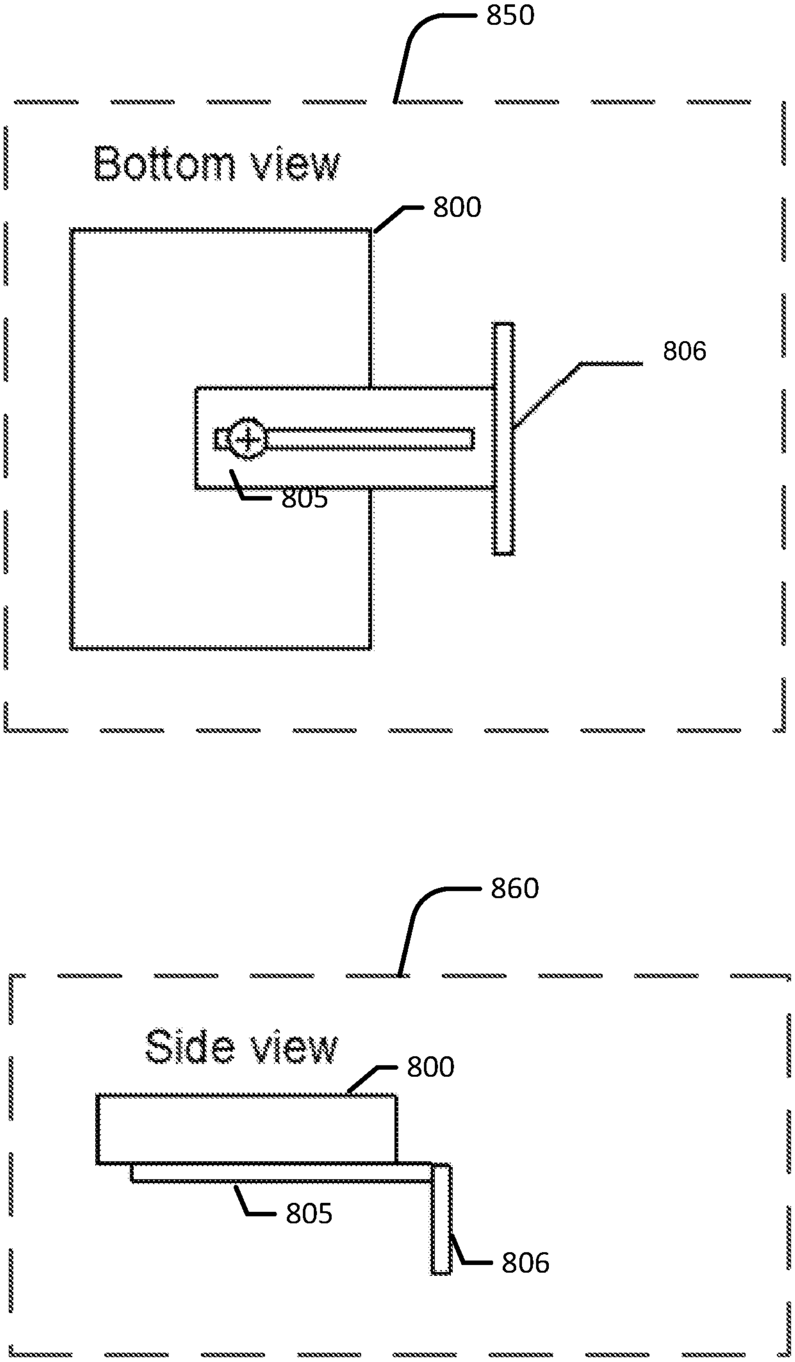

FIGS. 8A and 8B show various views for one or more embodiments for a security sensor that may be used in various embodiments described herein. In particular, the example security sensor may be used as one of the security sensors in FIG. 3 (e.g., one of the security sensors 307 for monitoring a window). Some types of sensors that monitor entry points, such as a window, can be of a two-piece design: one piece being a magnet and a second piece being a sensor for sensing changes in a magnetic field based on the sensor's proximity to the magnet. These two pieces, however, need to be aligned, which can complicate installation and negatively impact reliability of the sensor during operation.

FIGS. 8A and 8B show one or more example embodiments for a pressure sensor 800 of a one-piece design that is suitable for use as a security sensor in various embodiments described herein. In some embodiments, the pressure sensor 800 may be suitable for monitoring certain types of windows (e.g., a window where two surfaces, such as window sashes meet). In particular, FIG. 8A provides multiple views of the pressure sensor 800. In particular, the example pressure sensor 800 may be used as one of the security sensors in FIG. 3 (e.g., one of the security sensors 307 for monitoring a window). As shown at view 810, which is a side view, pressure sensor 800 may be configured with a pressure plate 806 as an integral component of the pressure sensor 800. Pressure sensor 800 may also be configured with a surface 807 that is to rest on one of the sashes of a window or otherwise be affixed to one of the sashes (e.g., via an adhesive).

As shown at view 820, pressure sensor 800 is depicted as being installed in a window 801 with a first sash 805-*a*, a second sash 805-*b*, and a locking mechanism 802. As shown at view 820, the pressure sensor 800 may be installed on one of the sashes (e.g., sash 805-*a*). Because the two sashes 805-*a* and 805-*b* are together when the window 802 is in the closed position, the pressure plate 806 may be between the two sashes. When the pressure sensor 800 is operating to collect data from the pressure plate 806, the pressure exerted on the pressure plate 806 by being between the two sashes 805-*a* and 805-*b* may cause the pressure sensor 806 to measure data indicative of a high pressure. View 840 shows the pressure plate 806 as being between the two sashes 805-*a* and 805-*b*, such as when the window 801 is closed.

The two sashes 805-*a* and 805-*b* are not together in all window positions. Indeed, as the window is opened, the two sashes move away from each other until the two sashes 805-*a* and 805-*b* are separated from each other. The pressure plate 806, by no longer being between the two sashes 805-*a* and 805-*b*, may be registering less pressure as compared to when the pressure plate 806 was between the two sashes 805-*a* and 805-*b*. Accordingly, when the pressure sensor 800 is operating to collect data from the pressure plate 806, the lack (or lessening) of the pressure being registered by the pressure plate 806 may cause the pressure sensor 800 to measure data indicative of a low pressure. View 830 shows the pressure plate 806 when the two sashes 805-*a* and 805-*b* are separated based on the opening of the window.

In some examples, the pressure plate 806 may be sized so that the pressure plate 806 is between the two sashes 805-*a* and 805-*b* when the two sashes 805-*a* and 805-*b* are slightly offset or, in other words, when the window 801 is slightly open. For example, the pressure plate 806 may be sized such that it is less than, equal to, or greater than the length of a sash. The length of the pressure plate 806 may be form a direct relationship to the distance of the offset between the two sashes 805-*a* and 805-*b* and/or the distance the window 801 may be opened while also maintaining the pressure plate 806 between the two sashes 805-*a* and 805-*b*. Allowing the pressure plate 806 to be between the two sashes 805-*a* and 805-*b* when the two sashes 805-*a* and 805-*b* are slightly offset (or when the window is otherwise slightly open) may, in some examples, allow for a security system to arm itself while the window 801 is open.

The pressure sensor 800 may, in some examples, include adjustment mechanism, such as a spring loaded or foam-based mechanism, that is configured to adjust for the distance between the two sashes 805-*a* and 805-*b*. FIG. 8B shows various views of an example embodiment for the pressure sensor 800 that includes an adjustable mechanism 805. View 850 provides a bottom view of the pressure sensor 800. The adjustable mechanism 805 may secure the pressure plate 806 as an integral component to the pressure sensor 800. The adjustable mechanism 805 may be adjustable so that when the pressure sensor 800 is installed on the window sash, the pressure plate 806 is able to be inserted between the two sashes 805-*a* and 805-*b* as the window 801 is closed. For example, with respect to the orientation of view 810, the adjustable mechanism may allow for the pressure plate 806 to be moved left and right until a desired distance from the body of the sensor 800 is achieved. View 860 provides a side view of the pressure sensor 800 that includes the adjustable mechanism 805.

Additionally, although the embodiments shown in FIGS. 8A and 8B are primarily directed to monitoring a window, the embodiments of the pressure sensor 800 could be used to monitor other types of entry points, areas of interest, or items of interest. For example, the illustrated embodiments are suitable for use where any two surfaces meet (e.g., doors, refrigerator doors, pill boxes, automobile doors, and the like).

The descriptions above are merely example embodiments of various concepts. They may be rearranged/divided/combined as desired, and one or more components or steps may be added or removed without departing from the spirit of the present disclosure. The scope of this patent should only be determined by the claims that follow.

The invention claimed is:

1. A premises management system comprising:
a pressure sensor located on a first sash of a window at a premises; and
a pressure plate coupled to the pressure sensor, wherein:
the pressure plate is located between the first sash of the window and a second sash of the window, and
a position of the pressure plate relative to the pressure sensor is adjustable.

2. The premises management system of claim 1, wherein the pressure sensor is configured to generate data based on a pressure registered by the pressure plate.

3. The premises management system of claim 1, wherein a size of the pressure plate is based on at least one of:
a distance between the first sash and the second sash, or
a maximum distance the window can be opened.

4. The premises management system of claim 1, wherein the pressure sensor is in communication with a computing device of the premises management system.

5. The premises management system of claim 1, wherein the pressure plate is coupled to the pressure sensor via an adjustable linkage.

6. The premises management system of claim 1, wherein the pressure plate is coupled to the pressure sensor via at least one of a spring or foam.

7. The premises management system of claim 1, wherein a position of the pressure plate between the first sash and the second sash is adjustable.

8. A premises management system comprising:
a pressure sensor located on a first sash of a window at a premises; and
a pressure plate coupled to the pressure sensor, wherein:
the pressure plate is located between the first sash of the window and a second sash of the window, and
a position of the pressure plate between the first sash and the second sash is adjustable.

9. The premises management system of claim 8, wherein the pressure sensor is configured to measure data based on a pressure registered by the pressure plate.

10. The premises management system of claim 8, wherein a size of the pressure plate is based on at least one of:
a distance between the first sash and the second sash, or
a maximum distance the window can be opened.

11. The premises management system of claim 8, wherein the pressure sensor is in communication with a computing device of the premises management system.

12. The premises management system of claim 8, wherein the pressure plate is coupled to the pressure sensor via an adjustable linkage.

13. The premises management system of claim 8, wherein the pressure plate is coupled to the pressure sensor via at least one of a spring or foam.

14. The premises management system of claim 8, wherein a position of the pressure plate relative to the pressure sensor is adjustable.

15. A pressure sensor comprising:
a sensor configured for communication with a computing device of a premises management system; and
a pressure plate coupled to the sensor and configured for placement between first and second sashes of a window, wherein
a position of the pressure plate relative to the sensor is adjustable.

16. The pressure sensor of claim 15, wherein the sensor is configured to measure data based on a pressure registered by the pressure plate.

17. The pressure sensor of claim 15, wherein a size of the pressure plate is based on a distance between the first sash and the second sash.

18. The pressure sensor of claim 15, wherein a size of the pressure plate is based on a maximum distance the window can be opened.

19. The pressure sensor of claim 15, wherein the pressure plate is coupled to the sensor via an adjustable linkage.

20. The pressure sensor of claim 15, wherein the pressure plate is coupled to the sensor via at least one of a spring or foam.

* * * * *